US010914441B2

(12) United States Patent
Lawrence

(10) Patent No.: US 10,914,441 B2
(45) Date of Patent: Feb. 9, 2021

(54) LIGHTING SYSTEM WITH REPLACEABLE DOWNLIGHT

(71) Applicant: Nicor, Inc., Albuquerque, NM (US)

(72) Inventor: Rocklan E. Lawrence, Albuquerque, NM (US)

(73) Assignee: NICOR, INC., Albuquerque, NM (US)

( * ) Notice: Subject to any disclaimer, the term of this patent is extended or adjusted under 35 U.S.C. 154(b) by 0 days.

(21) Appl. No.: 16/268,398

(22) Filed: Feb. 5, 2019

(65) Prior Publication Data

US 2019/0346098 A1 Nov. 14, 2019

Related U.S. Application Data

(60) Provisional application No. 62/800,367, filed on Feb. 1, 2019, provisional application No. 62/668,802, filed on May 8, 2018.

(51) Int. Cl.
| | |
|---|---|
| *F21S 8/04* | (2006.01) |
| *F21V 23/00* | (2015.01) |
| *F21V 25/12* | (2006.01) |
| *F21V 23/06* | (2006.01) |
| *H02G 3/20* | (2006.01) |
| *F21V 21/03* | (2006.01) |
| *F21V 17/16* | (2006.01) |
| *F21Y 115/10* | (2016.01) |

(52) U.S. Cl.
CPC ............ *F21S 8/043* (2013.01); *F21V 17/164* (2013.01); *F21V 21/03* (2013.01); *F21V 23/001* (2013.01); *F21V 23/06* (2013.01); *F21V 25/12* (2013.01); *H02G 3/20* (2013.01); *F21Y 2115/10* (2016.08)

(58) Field of Classification Search
CPC ........ F21S 8/043; F21V 17/164; F21V 21/03; F21V 25/12; F21V 23/001; F21V 23/06; H02G 3/20; F21Y 2115/10
See application file for complete search history.

(56) References Cited

U.S. PATENT DOCUMENTS 2,227,655 A * 1/1941 Levy .................... F21S 8/02
362/366
5,588,737 A * 12/1996 Kusmer .............. F21V 19/0005
174/660

(Continued)

FOREIGN PATENT DOCUMENTS

CA 2661390 A1 * 9/2010 ................ F21S 8/02

*Primary Examiner* — Donald L Raleigh
(74) *Attorney, Agent, or Firm* — Loza & Loza LLP; Richard H. Krukar

(57) ABSTRACT

A lighting system having a LED downlight in a ceiling fixture can be attached to a ceiling by fixing hanger bars to ceiling rafters. The lighting system can then be completely covered by insulation. The insulation thereby lays directly on the downlight, junction box, and a cup passing mains power from the junction box to the downlight. The insulation does not enter the cup, downlight, or junction box. The lighting system does not ignite or melt the insulation in normal operation if the insulation meets residential and commercial safety standards. In normal operation the lighting system does not expose the lighting system to a temperature exceeding 90 degrees Celsius. A trim can be attached to the downlight to change its appearance and without rendering the lighting system unsafe.

20 Claims, 28 Drawing Sheets

(56) References Cited

U.S. PATENT DOCUMENTS

| | | | | |
|---|---|---|---|---|
| 5,707,143 A * | 1/1998 | Hentz | ............... | F21S 8/02 362/147 |
| 5,941,625 A * | 8/1999 | Morand | ............... | F21S 8/02 248/343 |
| 5,951,151 A * | 9/1999 | Doubeck | ............... | F21S 8/02 362/294 |
| 6,343,873 B1 * | 2/2002 | Eberhard | ............... | F21S 8/02 362/147 |
| 6,364,511 B1 * | 4/2002 | Cohen | ............... | F21S 8/02 362/148 |
| 7,311,423 B2 | 12/2007 | Frecska et al. | | |
| 7,476,004 B2 | 1/2009 | Chan | | |
| 8,408,759 B1 * | 4/2013 | Rashidi | ............... | F21S 8/026 362/373 |
| 9,062,869 B2 * | 6/2015 | Lay | ............... | F21V 21/03 |
| 9,429,307 B1 * | 8/2016 | Kathawate | ............... | F21V 23/06 |
| 9,447,950 B1 * | 9/2016 | Wronski | ............... | F21V 17/02 |
| 9,702,533 B1 * | 7/2017 | Harpenau | ............... | F21V 21/03 |
| 9,903,569 B2 * | 2/2018 | O'Brien | ............... | F21V 21/02 |
| 10,041,638 B2 * | 8/2018 | Vasquez | ............... | F21S 8/026 |
| 2009/0097262 A1 * | 4/2009 | Zhang | ............... | F21S 8/026 362/364 |
| 2010/0020548 A1 * | 1/2010 | Tyson | ............... | F21V 31/005 362/321 |
| 2010/0296272 A1 * | 11/2010 | Roos | ............... | F21S 8/026 362/147 |
| 2012/0113628 A1 | 5/2012 | Burrow et al. | | |
| 2012/0182744 A1 * | 7/2012 | Santiago | ............... | F21S 8/026 362/365 |
| 2012/0218764 A1 * | 8/2012 | Williamson | ............... | F21S 8/026 362/294 |
| 2012/0250309 A1 | 10/2012 | Handsaker | | |
| 2012/0320627 A1 | 12/2012 | Araki et al. | | |
| 2014/0199168 A1 * | 7/2014 | Spiro | ............... | F04D 29/582 416/5 |
| 2014/0233246 A1 * | 8/2014 | Lafreniere | ............... | F21S 8/026 362/364 |
| 2015/0016100 A1 | 1/2015 | Ishii | | |
| 2015/0233537 A1 * | 8/2015 | Athalye | ............... | F21S 8/026 362/147 |
| 2015/0233556 A1 * | 8/2015 | Danesh | ............... | F21S 8/02 362/365 |
| 2016/0238226 A1 * | 8/2016 | Rashidi Doust | ............... | F21V 25/125 |
| 2018/0073687 A1 * | 3/2018 | Musser | ............... | F21K 9/275 |
| 2019/0049080 A1 * | 2/2019 | Danesh | ............... | H02G 3/20 |
| 2019/0056098 A1 * | 2/2019 | Blake | ............... | F21V 29/773 |
| 2019/0063701 A1 * | 2/2019 | Lotfi | ............... | F21S 9/022 |
| 2019/0145652 A1 * | 5/2019 | Sinur | ............... | F24F 13/078 454/294 |

* cited by examiner ual patent applications 62/668,802, and 62/800, 367. U.S. Provisional Application 62/668,802 is titled "Lighting Fixture with Replaceable Downlight" and was filed on May 8, 2018. U.S. Provisional Application 62/800, 367 is titled "Lighting System with Replaceable Downlight" and was filed on Feb. 1, 2019. Provisional Patent Applications 62/668,802, and 62/800,367 are herein incorporated by reference in their entirety.

LIGHTING SYSTEM WITH REPLACEABLE DOWNLIGHT

CROSS-REFERENCE AND PRIORITY TO PATENT APPLICATIONS

This patent application claims the priority and benefit of U.S. provisional patent applications 62/668,802, and 62/800, 367. U.S. Provisional Application 62/668,802 is titled "Lighting Fixture with Replaceable Downlight" and was filed on May 8, 2018. U.S. Provisional Application 62/800, 367 is titled "Lighting System with Replaceable Downlight" and was filed on Feb. 1, 2019. Provisional Patent Applications 62/668,802, and 62/800,367 are herein incorporated by reference in their entirety.

TECHNICAL FIELD

Embodiments are generally related to LED lighting, lighting systems, ceiling fixtures, LED downlights, and LED lighting power supplies.

BACKGROUND

Lighting systems have been evolving at a rapid pace with moves from incandescent, fluorescent, and gas discharge to light emitting diodes (LEDs). LEDs have been improving in efficiency, thermal management, and cost. Similarly, the power supplies, a.k.a. drivers, which drive the LEDs have seen improvements in efficiency, thermal management and cost. In general, residential and commercial lighting is transitioning to the use of LED lighting technologies.

Safety is a prime concern with residential and commercial lighting is safety. To that end, safety codes such as the National Electric Code (NEC) provide safety standards. Products can be marked in accordance with the NEC to indicate safety ratings or requirements. Another aspect of safety is that products can be tested and certified by testing laboratories to show that the products have passed certain tests. UL, LLC, formerly Underwriter's Laboratories, is a global safety consulting and certification company. UL LLC allows products to be marked with a "UL" certification after that product has passed certain safety tests. Commercial and residential lighting systems and components are required to have UL certification and to carry the proper NEC markings. Safety engineering is therefore a necessity for commercially successful products.

"IC" is a mark indicating that a product can function while in contact with insulation. For example, lighting systems with ceiling fixtures and LED downlights can be installed in ceilings with ceiling holes. Once installed, ceiling insulation above the ceiling can completely cover the ceiling fixture. "IC" is a mark indicating it is safe to do so. Other marks such as "IC-4" and "IC-F" can indicate that the lighting system is unlikely to combust insulation covering the fixture. In the past, this has been achieved with large cans and enclosures coupled with other thermal solutions. The large cans and enclosures add expense, size, and weight.

U.S. Pat. No. 7,311,423 by Frecska et al. issued on Dec. 25, 2007 and is titled "Adjustable LED Luminaire." Frecska teaches a luminaire having multiple movable LED strips in a large fixture. It is for its teachings of LED arrays, electronics, drivers, and fixtures that U.S. Pat. No. 7,311,423 is herein incorporated by reference in its entirety.

U.S. Pat. No. 7,476,004 by Chan issued on Jan. 13, 2009 and is titled "LED Lighting Lamp Tube." Chan teaches LED arrays mounted in tubes and configured to replace fluorescent light tubes in fluorescent fixtures. Replacements such as Chan's have provided an early upgrade path for commercial lighting in the move from fluorescent to LED. It is for its teachings of LED arrays, electronics, drivers, and fixtures that U.S. Pat. No. 7,476,004 is herein incorporated by reference in its entirety.

U.S. patent application Ser. No. 13/383,917 by Burrow et al. published as U.S. 20120113628 on May 10, 2012 and is titled "Light Emitting Diode Retrofit Conversion Kit for a Fluorescent Light Fixture." Burrow also teaches LED arrays configured to replace fluorescent light tubes in fluorescent fixtures. Replacements such as Burrow's have provided an early upgrade path for commercial lighting in the move from fluorescent to LED. It is for its teaching s of LED arrays, electronics, drivers, and fixtures that U.S. 20120113628 is herein incorporated by reference in its entirety.

U.S. patent application Ser. No. 13/075,494 by Handsaker published as U.S. 20120250309 on Oct. 4, 2012 and is titled "LED Lighting Fixture with Reconfigurable Light Distribution Pattern." Handsaker teaches modular LED arrays with reconfigurable lenses and a fixture with an extruded aluminum base. It is for its teachings of LED arrays, electronics, drivers, and fixtures that U.S. 20120250309 is herein incorporated by reference in its entirety.

U.S. patent application Ser. No. 13/473,929 by Araki, et al. published as U.S. 20120320627 on Dec. 20, 2012 and is titled "Flat Panel Lighting Device and Driving Circuitry." Araki teaches modular LED arrays and drivers configured in a relatively thin flat frame that can be edge lit. It is for its teachings of LED arrays, electronics, drivers, and fixtures that US 20120320627 is herein incorporated by reference in its entirety.

U.S. patent application Ser. No. 14/210,991 by Ishii published as U.S. 20150016100 on Jan. 15, 2015 and is titled "Luminaire." Ishii teaches a fixture having an LED array and drivers with a long lens covering the electronic components. It is for its teachings of LED arrays, electronics, drivers, and fixtures that U.S. 20150016100 is herein incorporated by reference in its entirety.

As can be inferred by this background section, the prior art discloses luminaires that can be used commercially once their safety is certified. However, the overall packaging, fixtures, drivers, interconnects, and designs are still evolving. Systems and methods that provide safe and easy to install LED lighting with advanced packaging, fixtures, drivers, interconnects, and designs are needed.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is an aspect of the embodiments that a fixture can hold a replaceable downlight. The fixture can be installed between the rafters in a ceiling or studs in a wall. A fixture with hanger bars, typically extendable hanger bars, can be nailed or otherwise attached to two rafters. A platform is attached to and between the hanger bars. The platform holds a junction box that can be wired to mains power (e.g. 120 VAC, 220 VAC) such that the fixture receives unconditioned electric power. An electric cable exiting the junction box carries electric power from the junction box to a cup. The cup is designed to be removably attached to a downlight.

The downlight can receive the electric power via the cup and use that electric power to create illumination. The downlight includes an LED lighting unit that shines light through a lens in the bottom of the downlight to thereby provide illumination. Proper design removes the needs for a can or enclosure while maintaining an IC rating The downlight must condition the electric power if the electric power is not already conditioned because the light emitting diodes (LEDs) in most LED lighting units, such as a LED lighting unit in a downlight, are best driven by a DC current. Some embodiments can provide unconditioned mains electric power to the downlight while others can provide conditioned electric power to the junction box.

Wiring can pass through a hole in the back of the downlight such that electric power can be passed into the downlight. For example, a connector on the end of the electric cable can be removable connected to a connector on the end of the power wiring.

The cup can be held to the downlight using cup clips and clip grooves. The cup can have cup clips positioned to engage clip grooves in the back of the downlight. When the cup clips engage the clip grooves, the cup is held to the downlight. The cup can be held to the downlight by cup tongues and slots. The cup tongues can extend from the cup and be configured to slide into the slots on the back of the cup. The cup tongues can have ends bent downward to help guide the engagement motion. The engagement motion can be a rotation. A slot disk attached to the back of the downlight can include the slots.

With the cup engaging the downlight, the downlight can swing on the end of the electric cable but is not fully installed. The downlights can be installed such that a ceiling fixture holds the downlight in a stationary location. The ceiling fixture can have a downlight guide, attached to or as part of the platform, into which the downlight can be installed. Screw threaded into the sides of the downlight guide can engage a rim on the side of the downlight to thereby hold the downlight. Positioners attached to the side of the downlight can help center the downlight within the downlight guide. Alternatively, the fixture can have supports attached to or as part of the platform. Suspension springs attached to the side of the downlight can engage the supports to thereby suspend the downlight from the supports.

The lighting system described here is advantageous because it removes the need for cans. At present, most lighting is installed in "cans" and those having some involvement with installing or maintaining lighting are quite familiar with cans. Here the fixture is open, thereby saving expense. It is through careful engineering that this new lighting system can function normally while covered by ceiling insulation installed above a ceiling

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
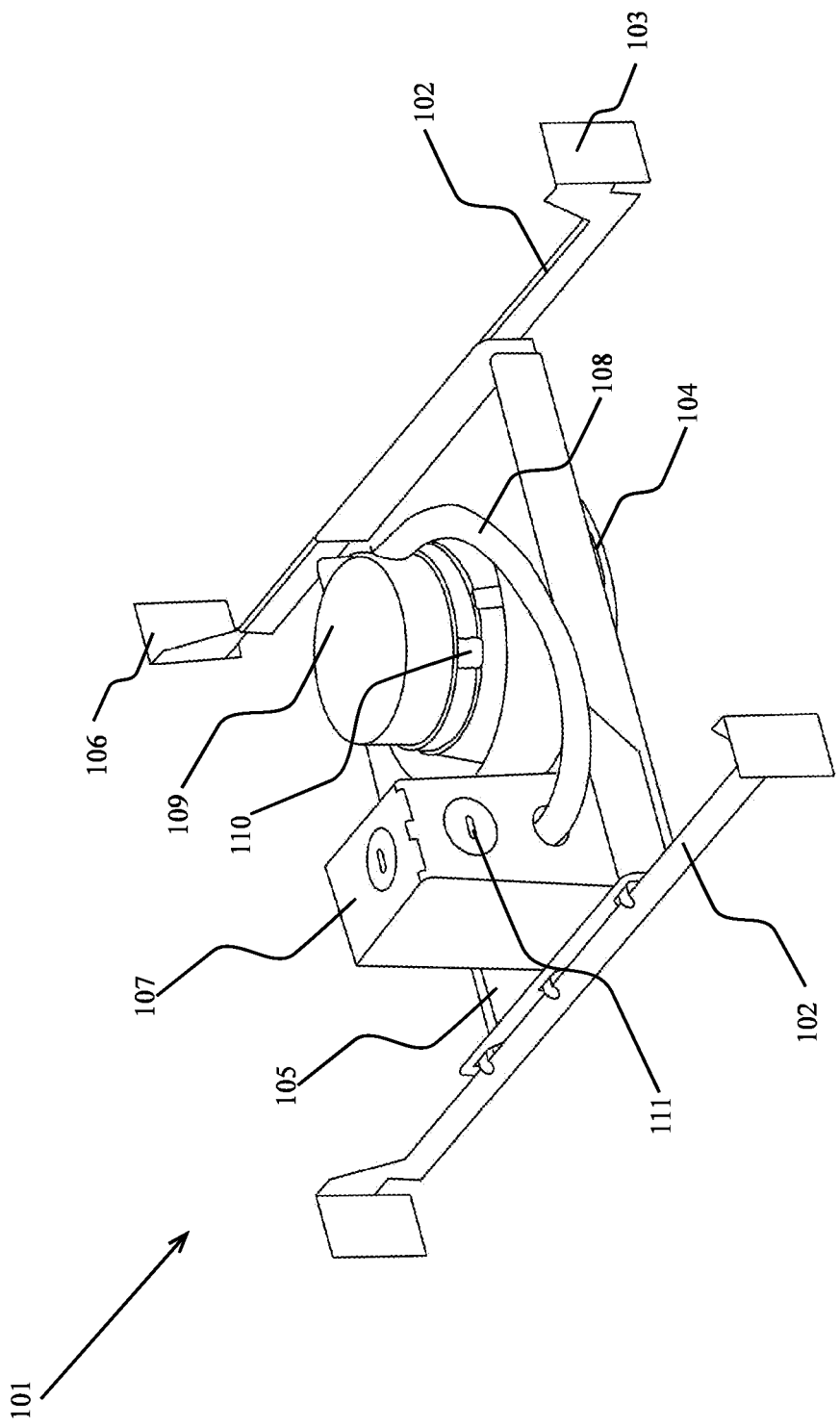
FIG. 1 illustrates a ceiling fixture with a downlight in accordance with aspects of the embodiments.
Figure 2:
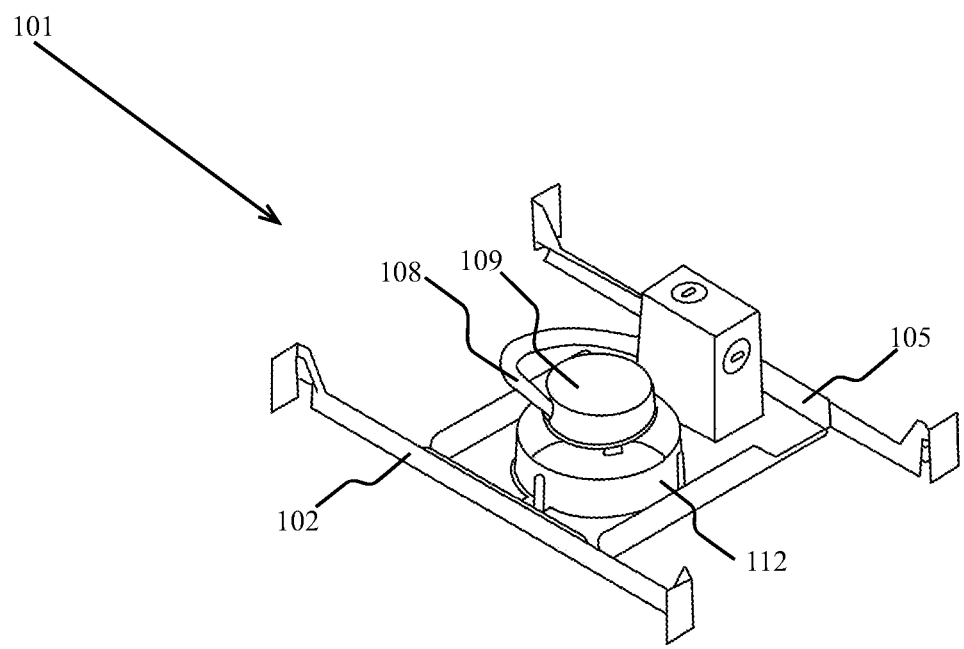
FIG. 2 illustrates the ceiling fixture of FIG. 1 without a downlight viewed from above in accordance with aspects of the embodiments.
Figure 3:
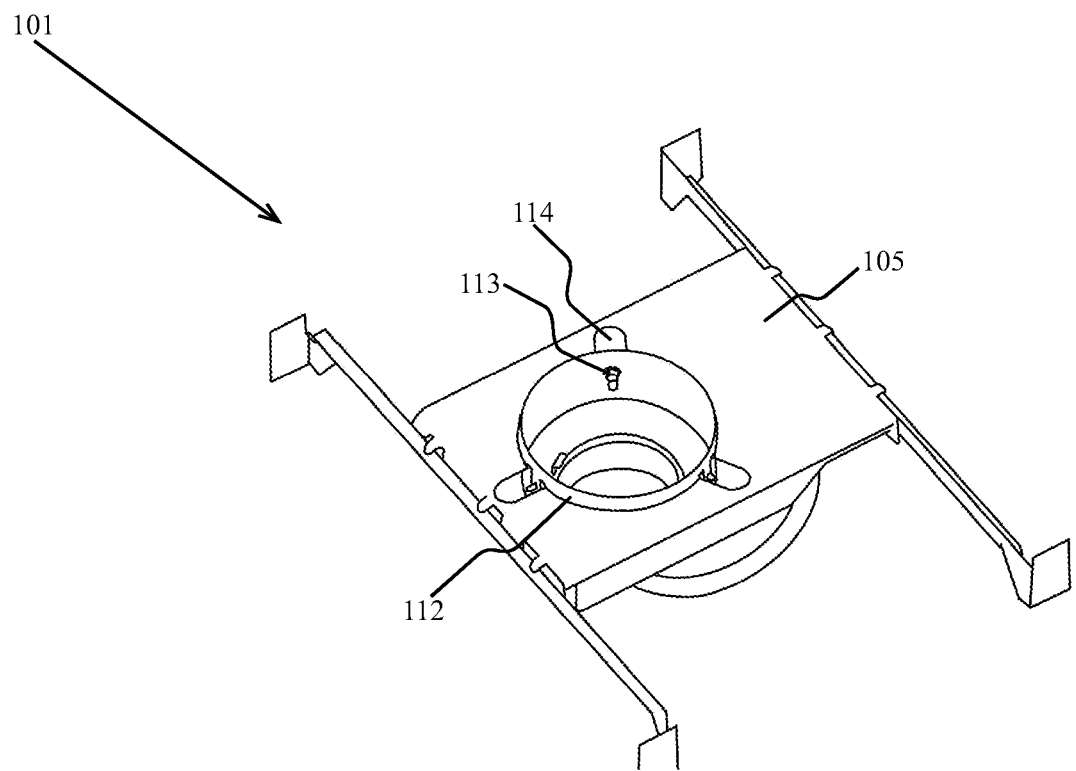
FIG. 3 illustrates the ceiling fixture of FIGS. 1-2 without a downlight viewed from below in accordance with aspects of the embodiments.

The particular values and configurations discussed in these non-limiting examples can be varied and are cited merely to illustrate at least one embodiment and are not intended to limit the scope thereof.

For a general understanding of the present disclosure, reference is made to the drawings. In the drawings, like reference numerals have been used throughout to designate identical elements.

Figure 4:
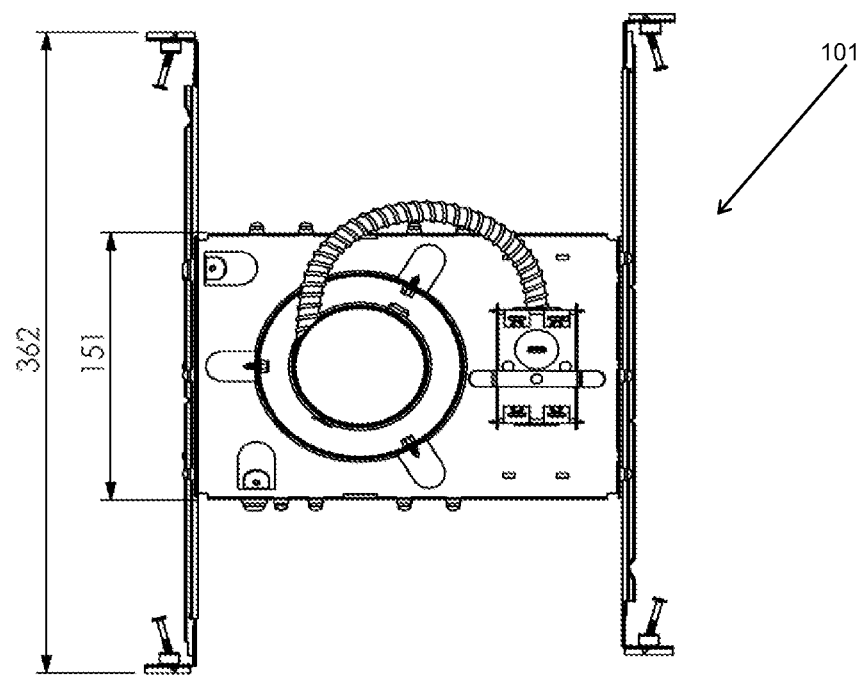
FIG. 4 illustrates a top view of the ceiling fixture of FIGS. 1-3, measurements in mm, in accordance with aspects of the embodiments.
Figure 5:
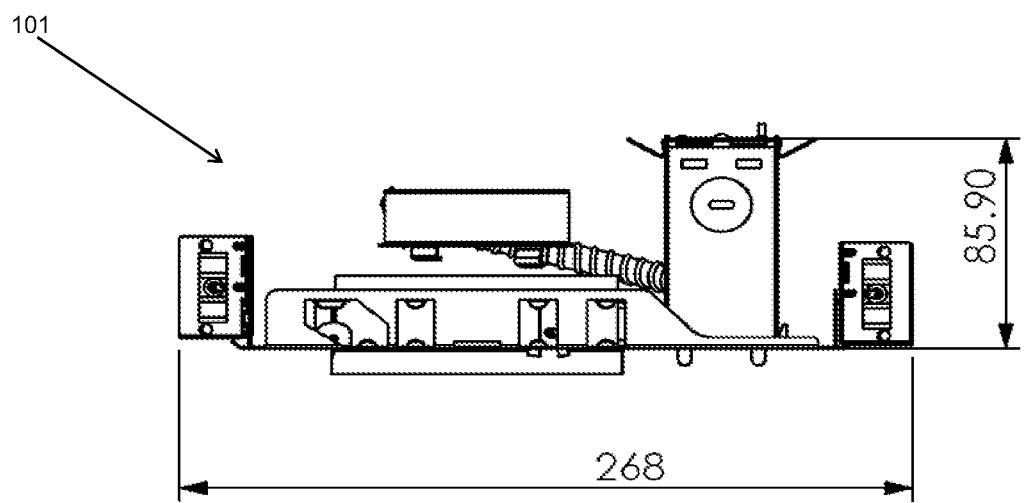
FIG. 5 illustrates a side view of the ceiling fixture of FIGS. 1-4, measurements in mm, in accordance with aspects of the embodiments.
Figure 6:
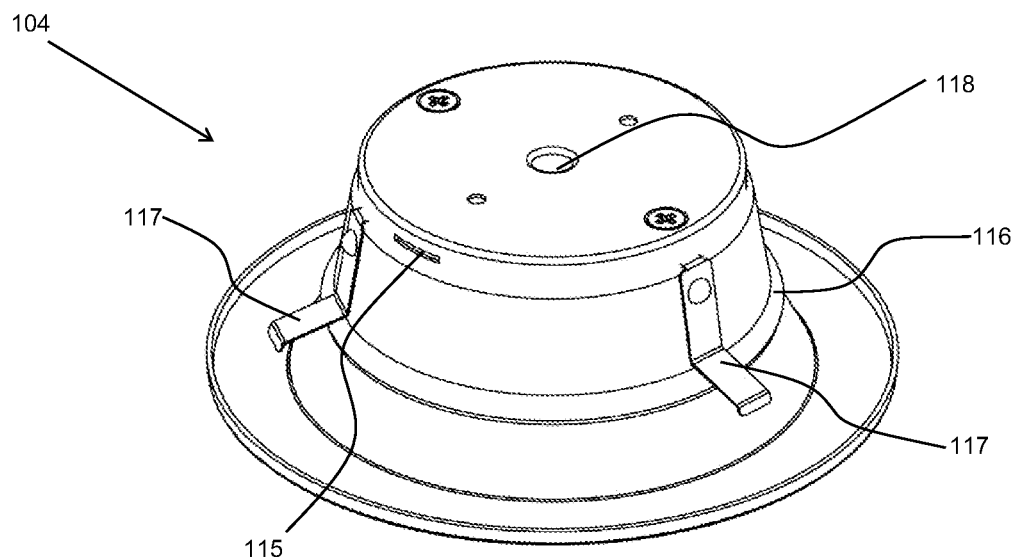
FIG. 6 illustrates the downlight with clip indents, seen in FIG. 1, viewed from above in accordance with aspects of the embodiments.
Figure 7:
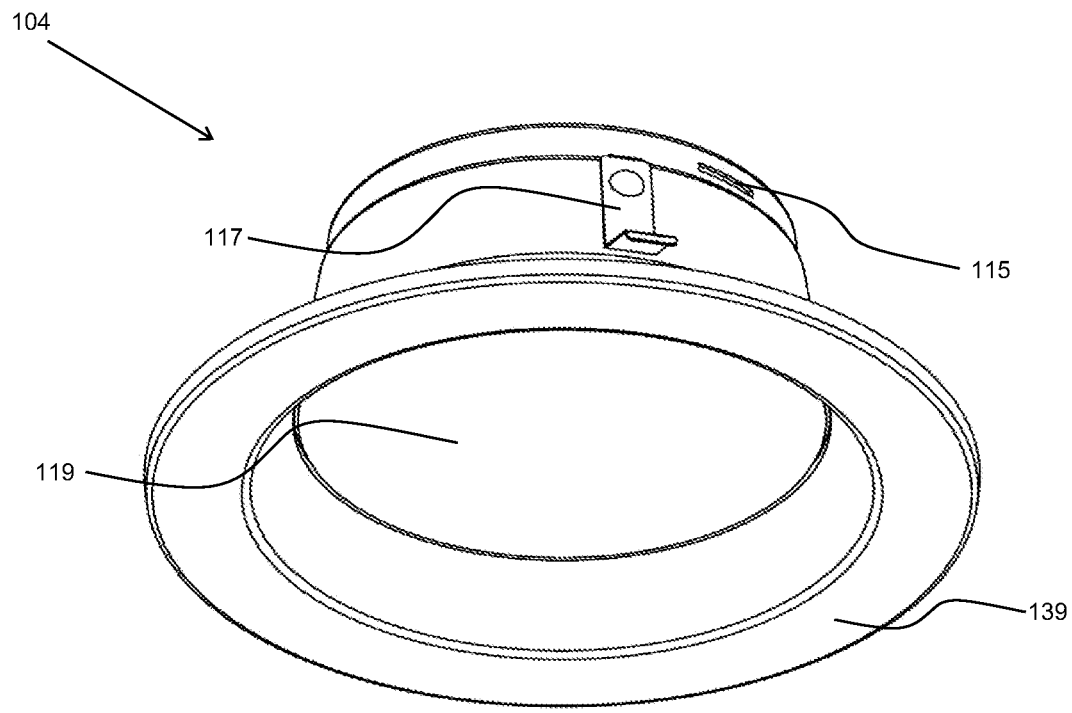
FIG. 7 illustrates the downlight of FIG. 6 viewed from below in accordance with aspects of the embodiments.
Figure 8:
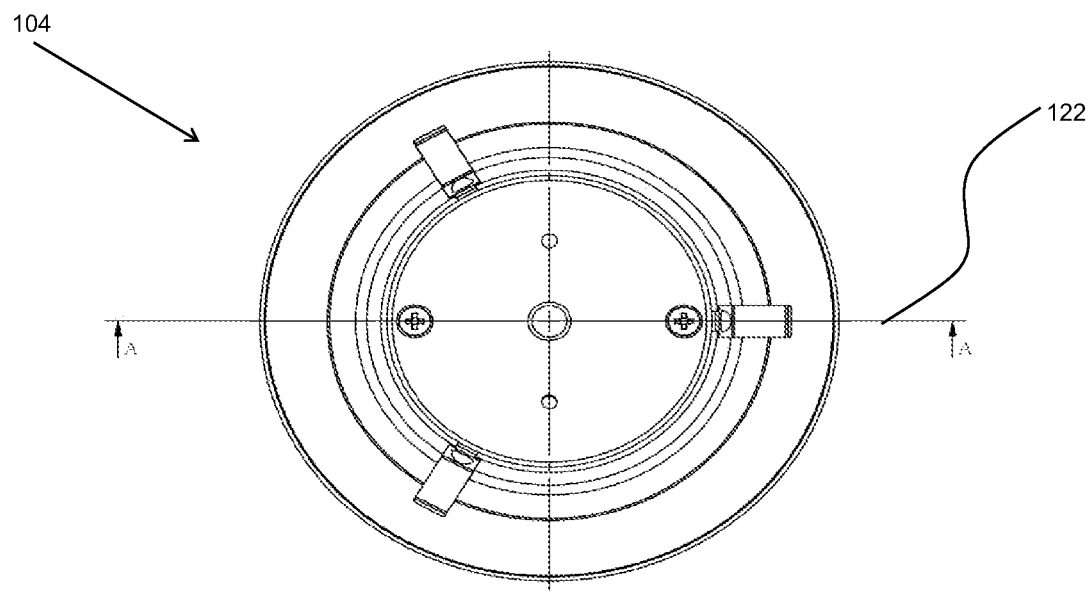
FIG. 8 illustrates top view of the downlight of FIGS. 6-7 in accordance with aspects of the embodiments.

FIGS. 1-5 illustrate a ceiling fixture 101 for holding and powering a downlight 104 in accordance with aspects of the embodiments. The measurements in FIGS. 4-5 are in millimeters and are intended to be descriptive but are not intended to be limiting examples. The extendable hanger bars 102 are attached to opposite sides of the platform 105. An extendable hanger bar 102 can be extended by pulling the hanger bar first end 103 away from the hanger bar second end 106. The opposite motion can shorten the hanger bars 102. The two hanger bars 102 are configured for installing the ceiling fixture 101 between rafters in a ceiling such that the downlight 104, once installed, is flush against the ceiling.

A junction box 107 is attached to the platform 105. Mains electric power, unconditioned electric power from the surrounding building, can be provided to the junction box 107 to power the ceiling fixture 101 and downlight 104. An electric cable 108 extends from the junction box 107 to a cup 109 attached to the end of the downlight 104. Mains electric power can thereby be passed from the junction box 107 to the downlight 104. Connectors under the cup can complete the route of electric power into the downlight 104. The cup 109 is held to the downlight 104 by cup clips 110 engaging clip indents 115 in the downlight 104. Knockouts 111 in the sides of the junction box 107 can be removed to obtain access, usually for wiring, into and out of the junction box 107.

A downlight guide 112 attached to the platform 105 has screws 113 threaded into its side. When tightened, the screws 113 can hold a downlight 104 in a stationary position in the downlight guide. Access holes 114 in the underside of the platform 105 of the ceiling fixture 101 provide access to the screws 113 such that a person under the ceiling fixture 101 can reach the screws 113 to install and remove downlights 104. Notice that FIG. 1 shows a downlight 104 in the ceiling fixture 101. No downlight 104 is illustrated in FIGS. 2-5.

Figure 9:
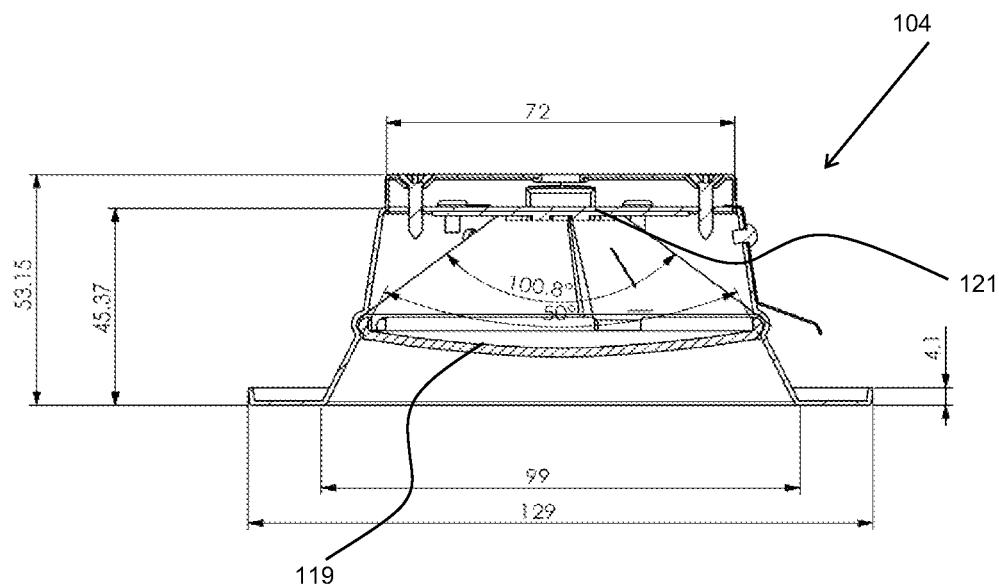
FIG. 9 illustrates a cut view from the side of the downlight of FIGS. 6-8, measurements in mm, in accordance with aspects of the embodiments.
Figure 10:
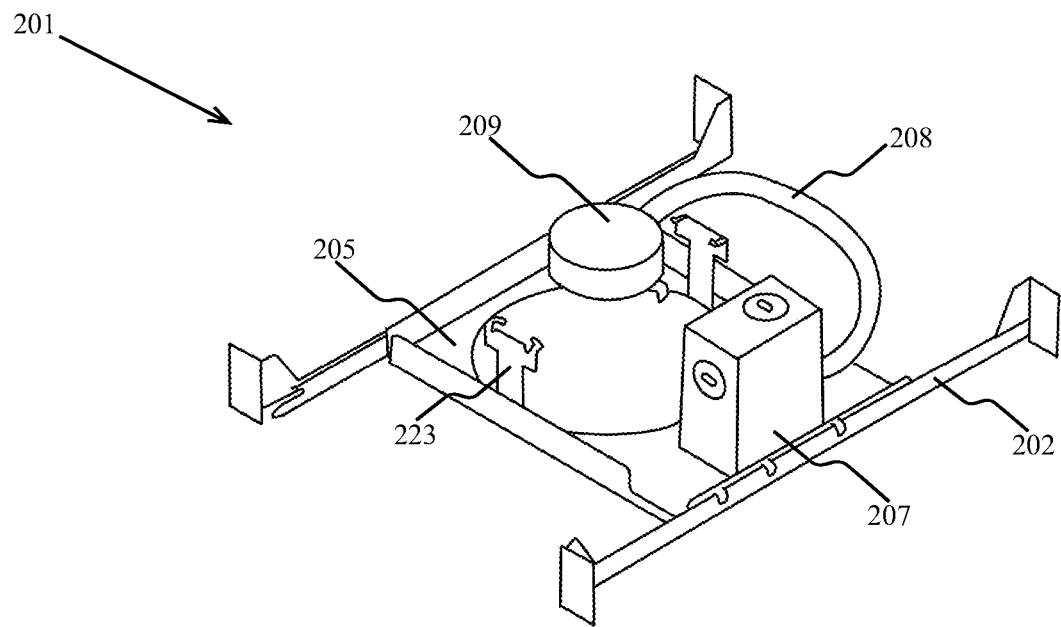
FIG. 10 illustrates a ceiling fixture with supports but no downlight viewed from above in accordance with aspects of the embodiments.
Figure 11:
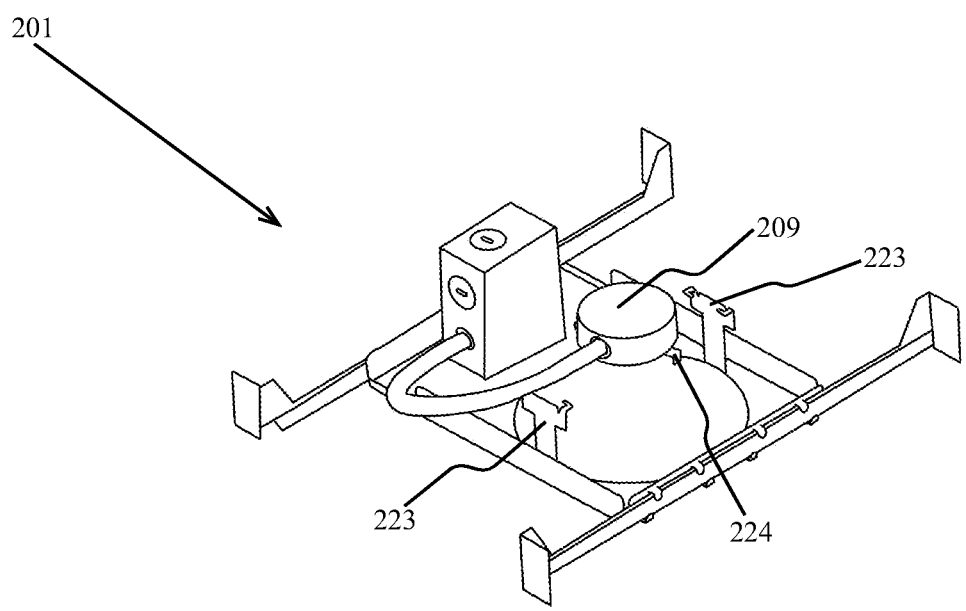
FIG. 11 illustrates the ceiling fixture of FIG. 10 viewed from above in accordance with aspects of the embodiments.
Figure 12:
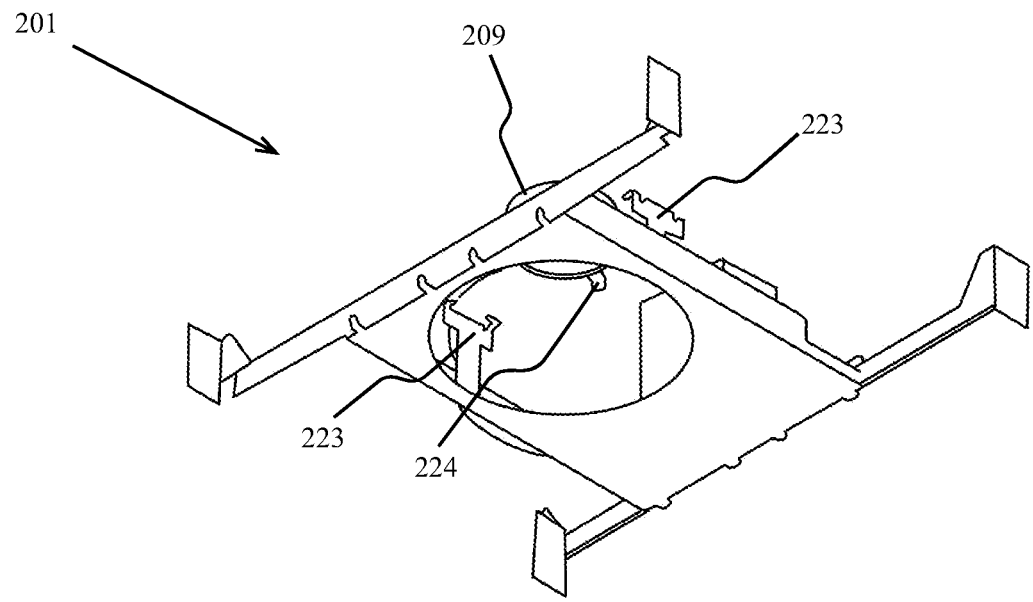
FIG. 12 illustrates the ceiling fixture of FIGS. 10-11 viewed from below in accordance with aspects of the embodiments.

FIGS. 6-9 illustrate various views of a downlight 104 with clip indents 115. The downlight 104 of FIGS. 6-9 is configured for use with the fixture of FIGS. 1-5. The screws 113 threaded through the downlight guide 112 can engage the engagement rim 116 on the side of the downlight 104. The positioners 117 can align the downlight 104 in the downlight guide 112, wiring passing through the wire hole 118 can conduct electric power into the downlight 104. The cup 109 is held to the downlight 104 when the cup clips 110 engage the clip indents 115. The downlight 104 has a downlight flange 139 to which a trim can be attached. Also, in FIG. 7, a lens 119 positioned below the LED array 121 on the LED lighting unit can be seen. FIG. 9 is a cut view of the downlight 104 of FIGS. 6-9 along a cut line 122 shown in FIG. 8. The measurements in FIG. 9 are in millimeters.

Figure 13:
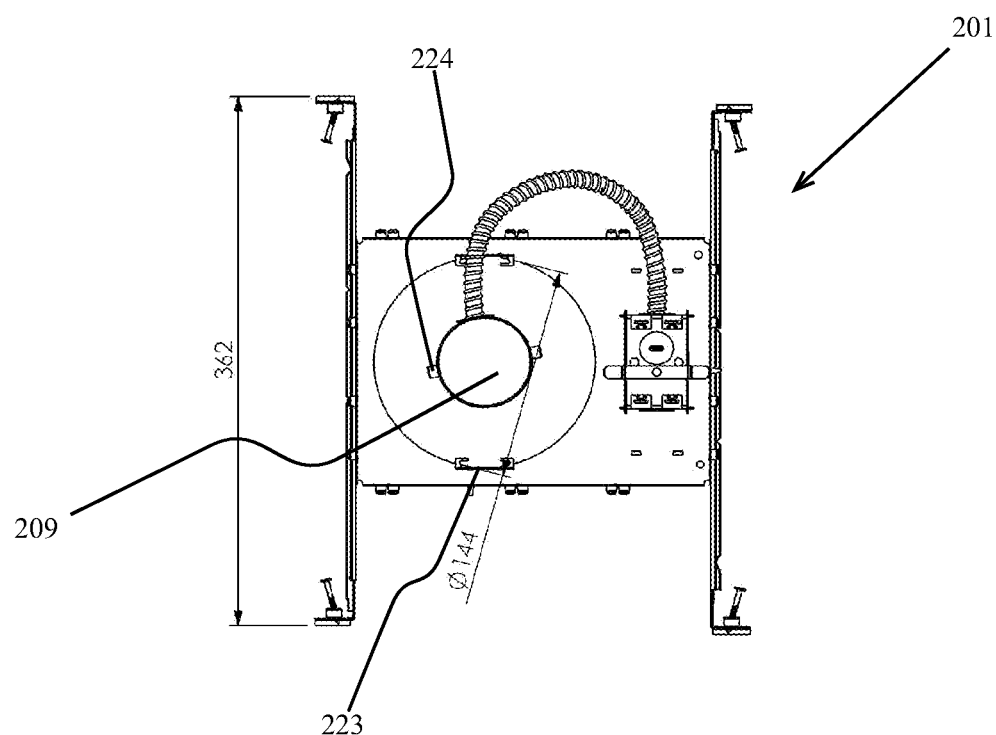
FIG. 13 illustrates a top view of the ceiling fixture of FIGS. 10-12, measurements in mm, in accordance with aspects of the embodiments.
Figure 14:
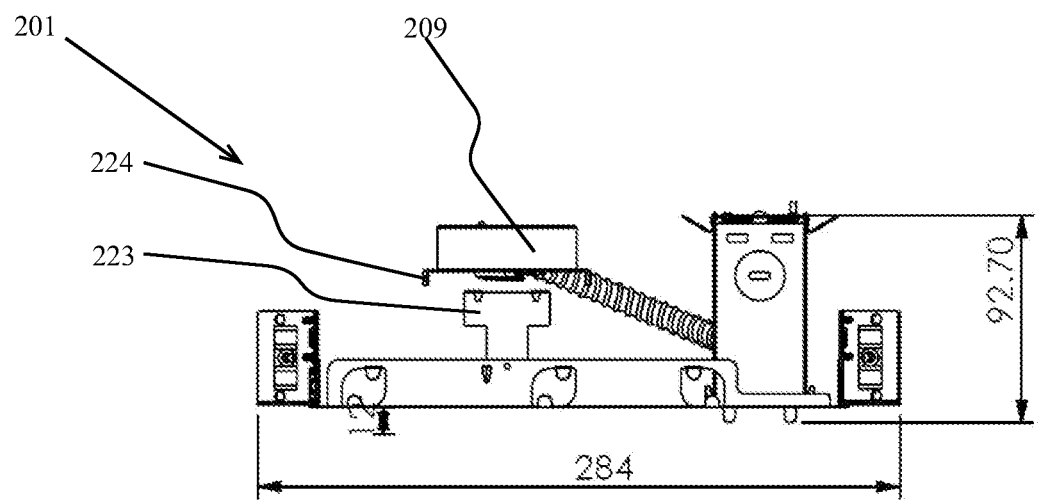
FIG. 14 illustrates a side view of the ceiling fixture of FIGS. 10-13, measurements in mm, in accordance with aspects of the embodiments.

FIG. 10-14 illustrate a ceiling fixture 201 with supports 223 but no downlight viewed from above in accordance with aspects of the embodiments. The ceiling fixture 201 of FIGS. 10-14 is very similar to that of FIGS. 1-5 excepting for using supports 223 to hold the downlight 204 stationary and using cup tongues 224 and slots 226 and raised tabs 225 to hold the cup 209 to the downlight 204. The measurements in FIGS. 13-14 are in millimeters. The downlight 204 of FIGS. 15-17 can be installed in the ceiling fixture of FIGS. 10-14.

Extendable hanger bars 202 attached to opposite sides of the platform 205. A junction box 207 is attached to the platform 205. Mains electric power can be provided to the junction box 207 to power the ceiling fixture 201 and downlight 204. An electric cable 208 extends from the junction box 207 to a cup 209 that can attach to the end of the downlight 204. Mains electric power can thereby be passed from the junction box 207 to the downlight 204. Connectors under the cup can complete the route of electric power into the downlight 204.

Figure 15:
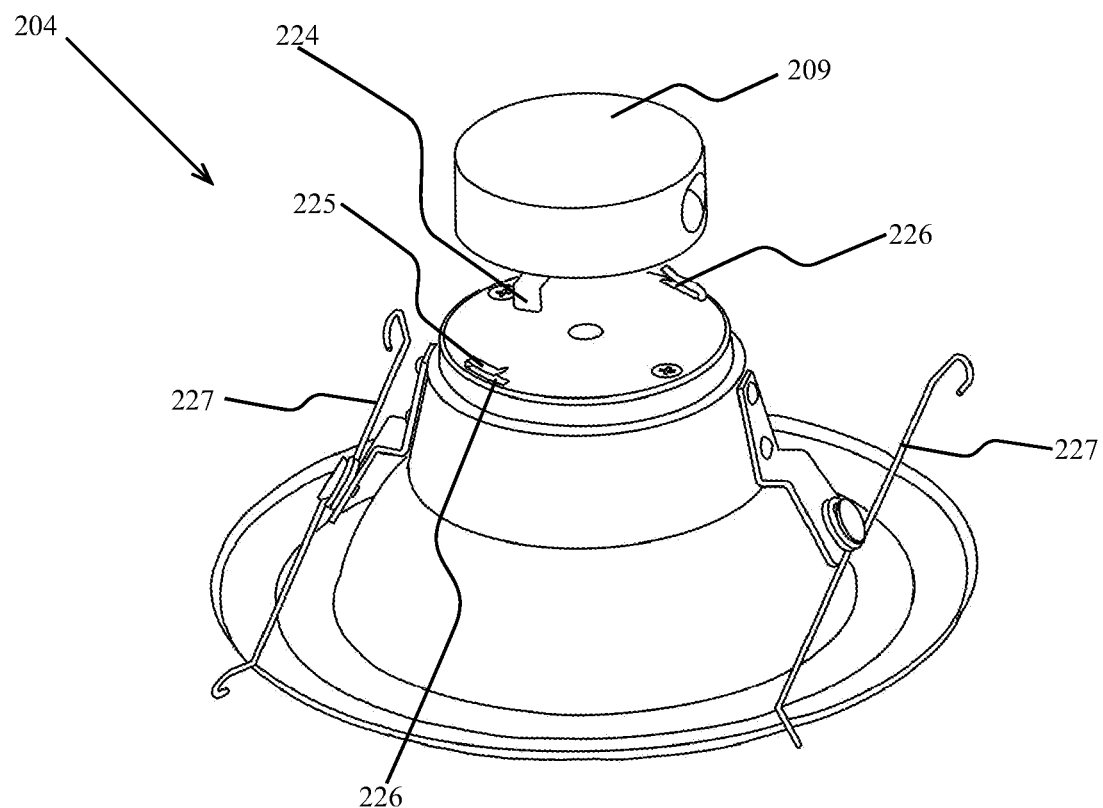
FIG. 15 illustrates a cup disengaged and separate from a downlight installable in the ceiling fixture of FIGS. 10-14, in accordance with aspects of the embodiments.
Figure 16:
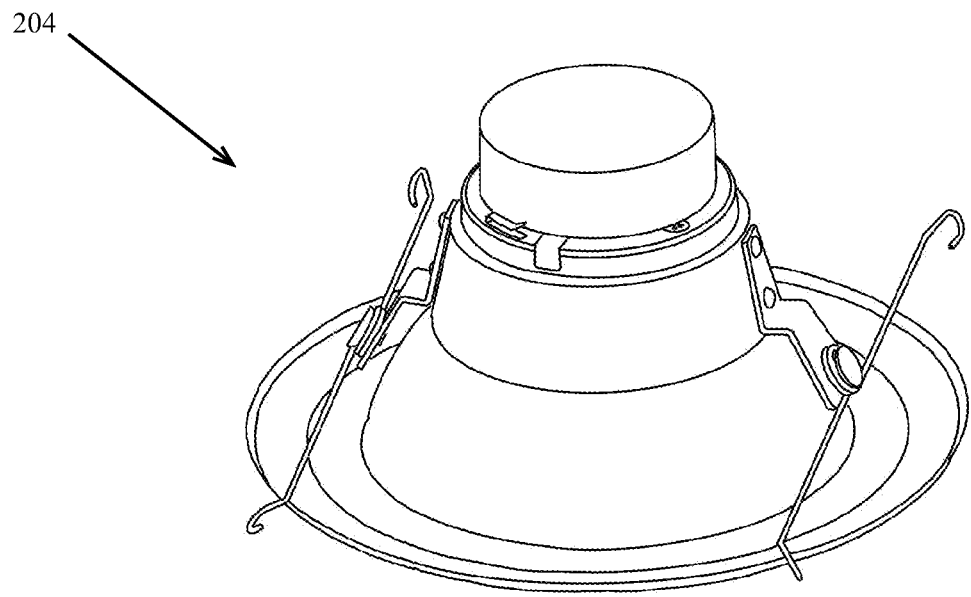
FIG. 16 illustrates a cup beginning to engage with a downlight in accordance with aspects of the embodiments.
Figure 17:
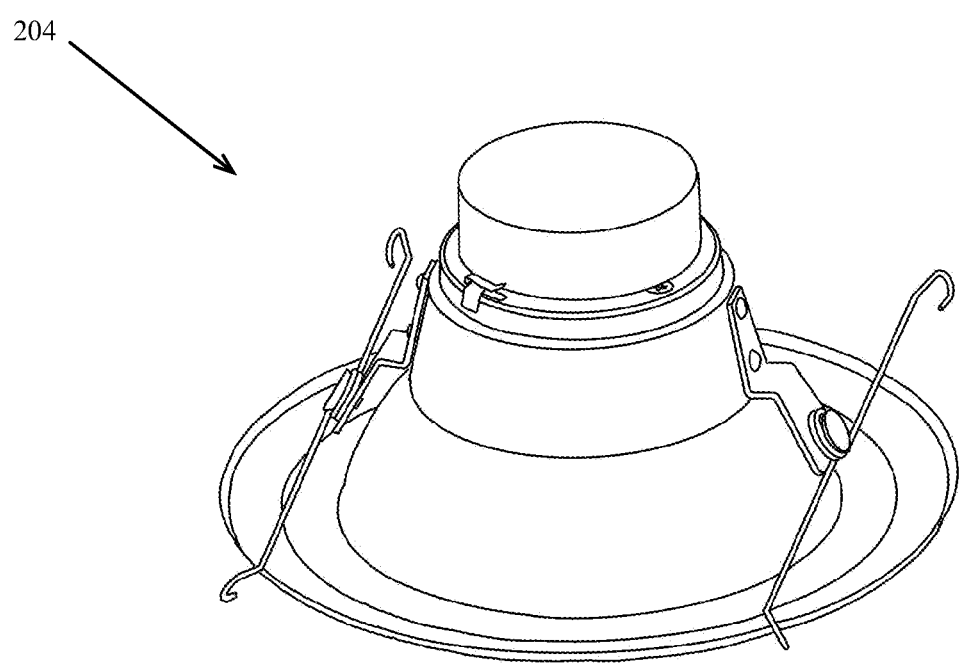
FIG. 17 illustrates a cup engaged with a downlight in accordance with aspects of the embodiments.

FIGS. 15-17 illustrate a cup 209 engaging a downlight 204. At FIG. 15, the cup 209 and downlight 204 are completely separate and disengaged. At FIG. 16, the cup 209 is positioned on the downlight 204 but hasn't been rotated into engagement. At FIG. 17, the cup 209 has been rotated relative to the downlight 204 such that the cup tongues 224 are under the raised tabs 225 and in the slots 226. The slots 226 are the small spaces under the raised tabs 225 lifted from and parallel to the back of the downlight 204. In FIG. 17, the cup 209 is engaging the downlight 204. During installation, the next step would involve engaging the suspension springs 227 with the supports 223 such that the downlight 204 is suspended from the supports 223 and is held stationary in the ceiling fixture 201.

Figure 18:
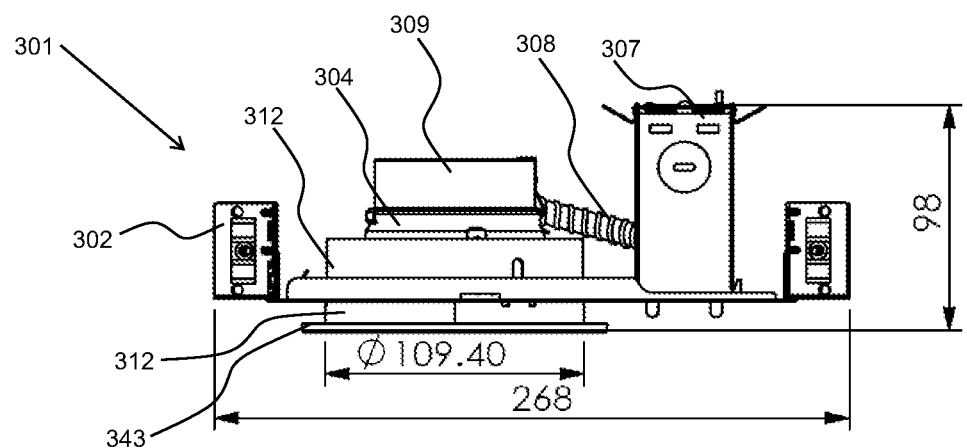
FIG. 18 illustrates a side view of a ceiling fixture with a downlight, measurements in mm, in accordance with aspects of the embodiments.
Figure 19:
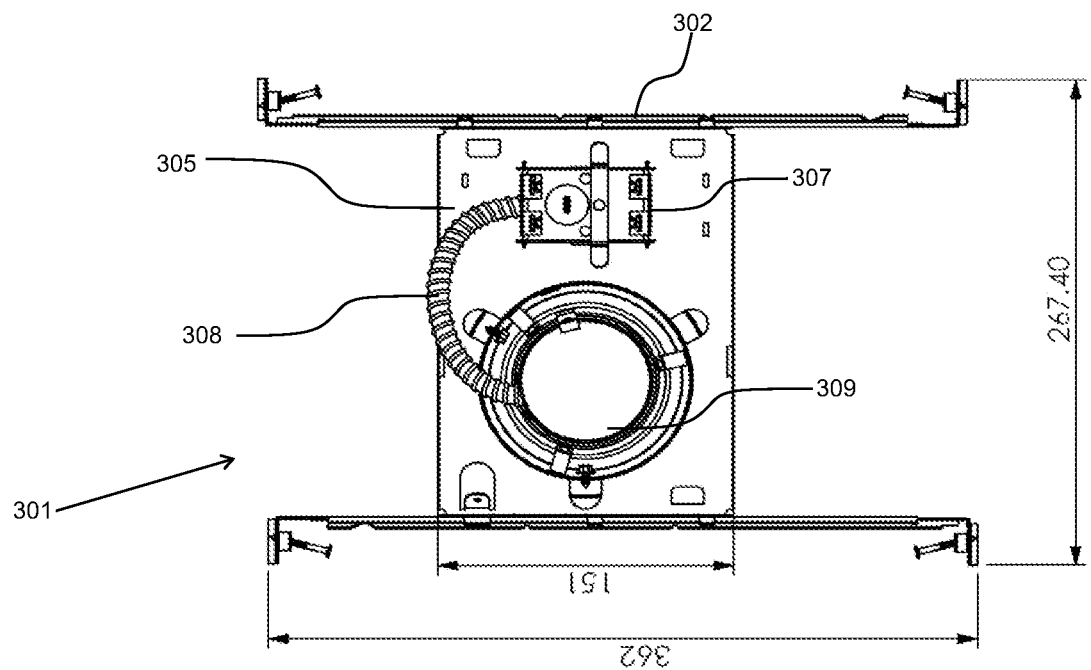
FIG. 19 illustrates a top view of the ceiling fixture and downlight of FIG. 18, measurements in mm, in accordance with aspects of the embodiments.
Figure 20:
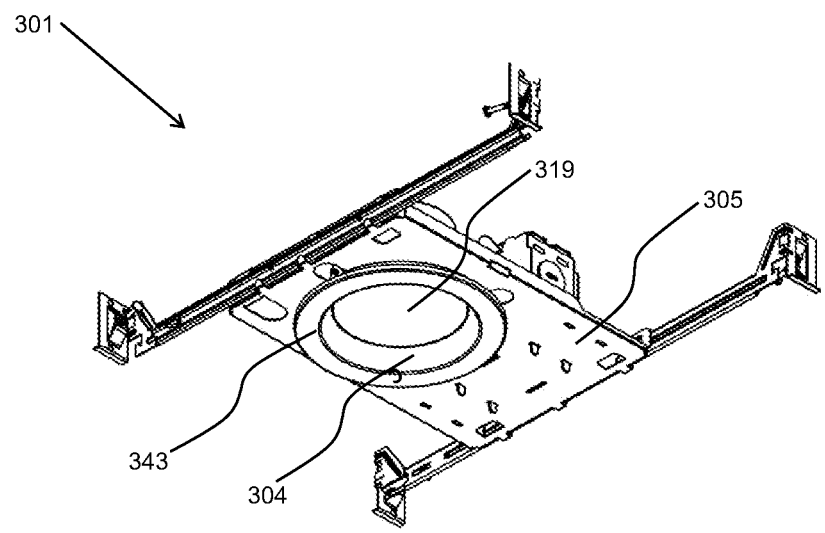
FIG. 20 illustrates the ceiling fixture and downlight of FIGS. 18-19 viewed from below in accordance with aspects of the embodiments.
Figure 21:
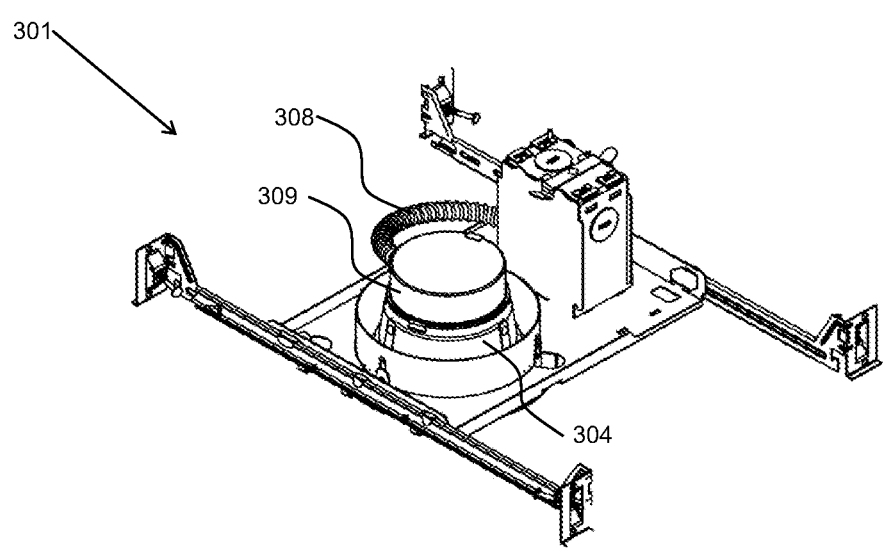
FIG. 21 illustrates the ceiling fixture and downlight of FIG. 18-20 viewed from above in accordance with aspects of the embodiments.
Figure 22:
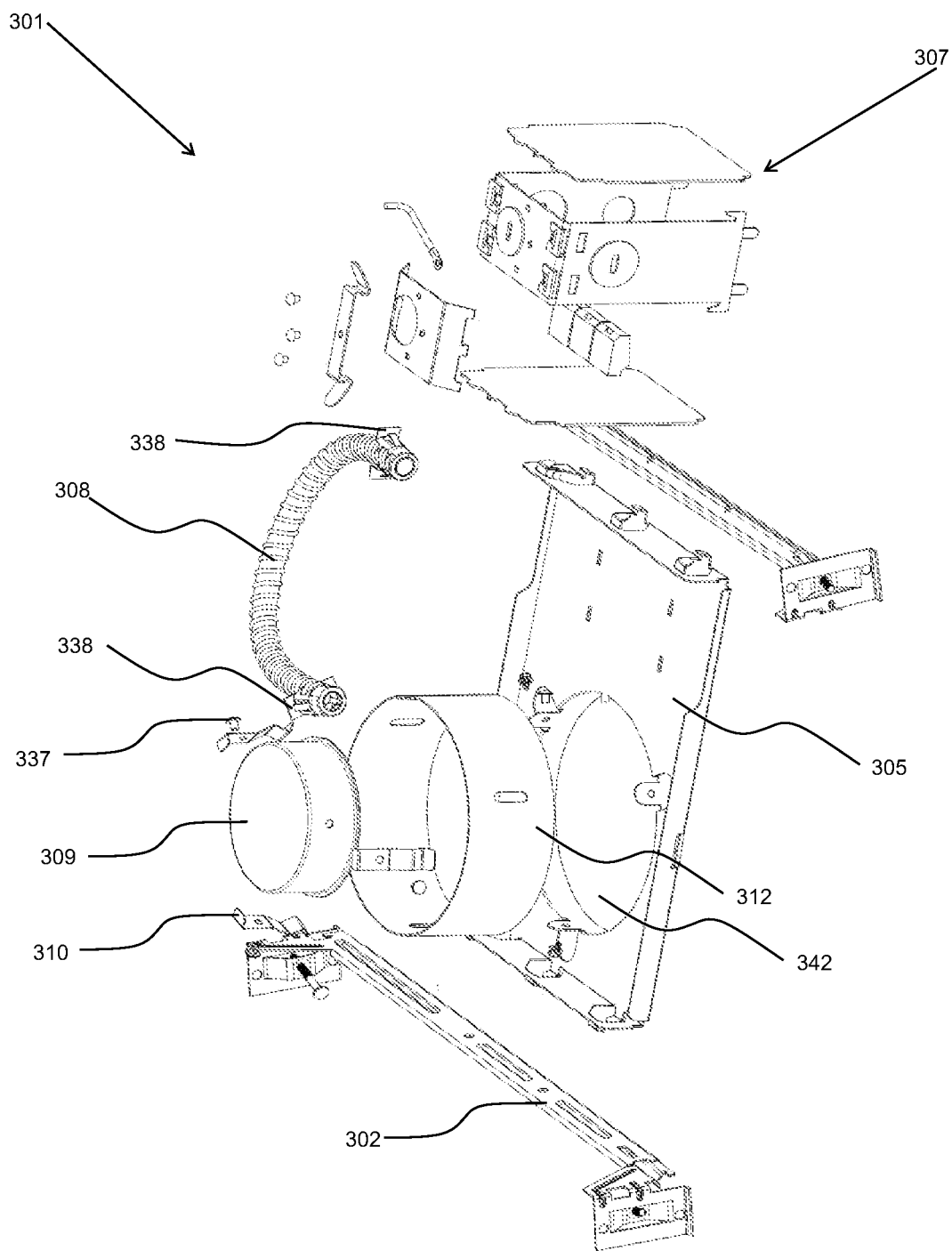
FIG. 22 illustrates an exploded view of the ceiling fixture of FIG. 18-21 in accordance with aspects of the embodiments.
Figure 23:
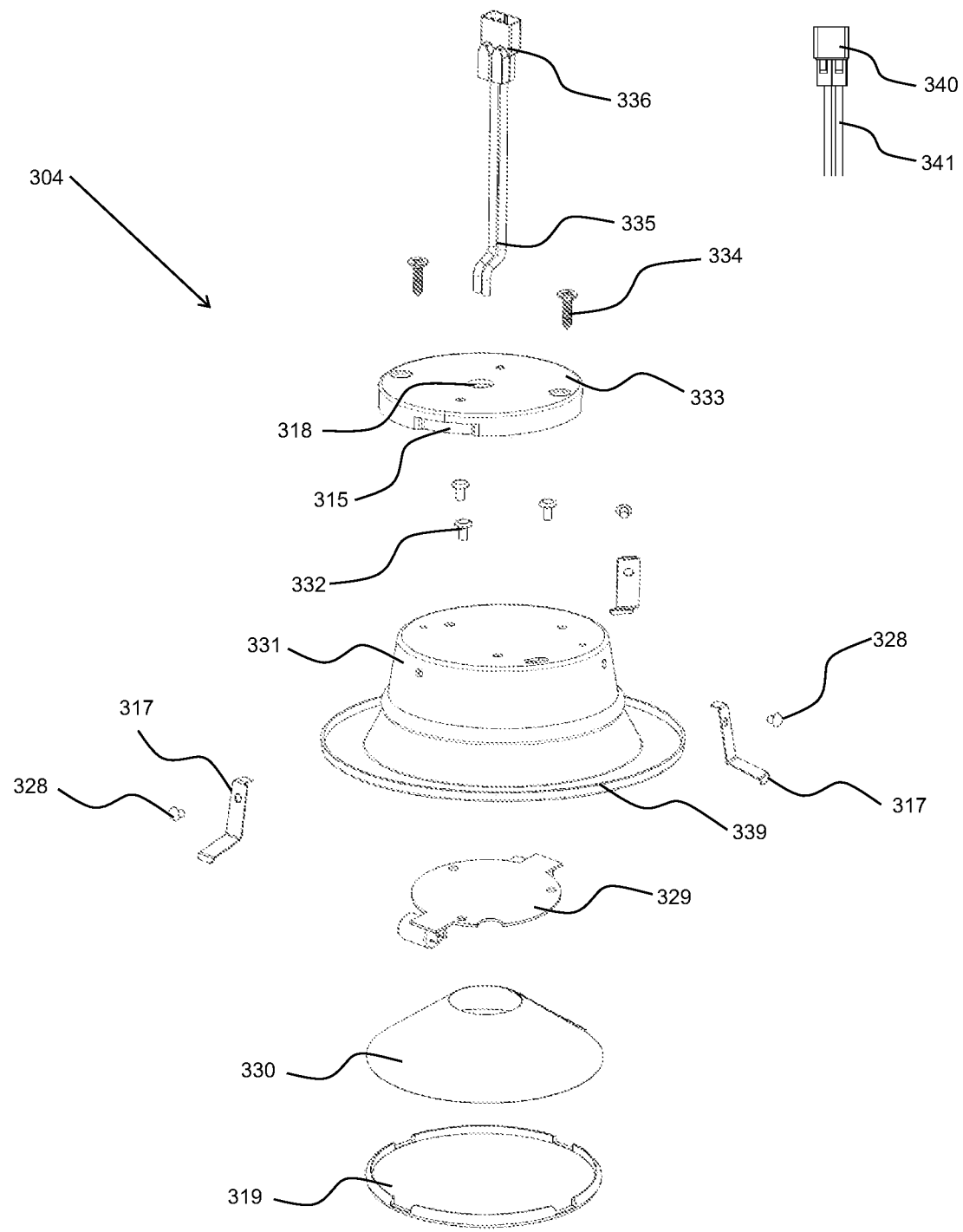
FIG. 23 illustrates an exploded view of the downlight of FIG. 18-21 in accordance with aspects of the embodiments.

FIGS. 18-21 illustrate a ceiling fixture 301 with a downlight 304 in accordance with aspects of the embodiments. The measurements of FIGS. 18-19 are in millimeters and are intended to be descriptive but are not intended to be limiting examples. The extendable hanger bars 302 are attached to opposite sides of the platform 305. The hanger bars 302 are configured for installing the ceiling fixture 301 between rafters in a ceiling such that the downlight 304, once installed, is flush against the ceiling. FIGS. 23-27 illustrate the downlight 304.

A junction box 307 is attached to the platform 305. Mains electric power can be provided to the junction box 307 to power the ceiling fixture 301 and downlight 304. An electric cable 308 extends from the junction box 307 to a cup 309 attached to the end of the downlight 304. Mains electric power can thereby be passed from the junction box 307 to the downlight 304. Connectors under the cup 309 can complete the route of electric power into the downlight 304. The cup 309 is held to the downlight 304 by cup clips 310 engaging clip indents 315 in the downlight 304. The cup clips 310 are attached to the cup 309 by rivets 337. Cable attachments 338 at either end of the electric cable 308 attach the electric cable 308 to the junction box 307 and cup 309. The electric cable 308 and cable attachments 338 are sized to prevent insulation and other materials from entering the cup 309 or junction box 307 via the holes through which the electric cable 308 enters the cup 309 and junction box 307.

A downlight guide 312 is attached to the platform 305. The positioners 317 of the downlight 304 can hold the downlight 304 in a stationary position in the downlight guide 312. The downlight guide is positioned in platform hole 342 and extending above and below the platform 305. As can be seen in the measurements, the downlight guide 312 and platform hole 342 are approximately 4.3 inches in diameter to thereby accommodate a four-inch downlight. As is well understood in the art, the term "four-inch" indicates a nominal size of the downlight and a fixture into which the downlight is designed to fit. "Four-inch" and "six-inch" are terms widely used in the art to indicate two different sizes of fixture and downlight.

FIGS. 23-27 illustrate various views of a downlight 304 with clip indents 315. The downlight 304 of FIGS. 23-27 is configured for use with the four-inch ceiling fixture 304 of FIGS. 18-22. The positioners 317 are attached to the downlight housing 331 by rivets 328 and can align the downlight 304 in the downlight guide 312. Wiring 335 passing through the wire hole 318 can conduct electric power into the downlight 304. The electric power can pass through electric cable 308, a first electric connector 340, a second electric connector 336, and into wiring 335. Wires 341 are shown because electric cable 308 is a shielded electric cable having a shield protecting wires, such as wires 341, that conduct electric power from the junction box 307 to the downlight 304. The first electric connector 340 and the second electric connector 336 are inside the cup 309 when the cup 309 is held to the downlight 304 by the cup clips 310 engaging the clip indents 315.

Screws 334 attach back plate 333 to the downlight housing 331. Fasteners 332 attach the LED lighting unit 329 to the downlight housing similar to the downlight housing and LED lighting unit of FIG. 9. Wiring 335 can be electrically connected to the LED lighting unit 329 that conditions the electric power from the junction box 307 to produce conditioned electric power. The LED lighting unit 329 has an LED array, such as that of FIG. 9, on its underside (not visible in FIG. 23) that produces light when it receives conditioned electric power. The light can then pass through lens 319 such that the downlight 304 produces illumination. A reflector 330 increase the amount of LED light exiting through the lens 319. The reflector 330 can be formed from a paper bent into a cone shape and having a reflective layer inside the cone.

Figure 24:
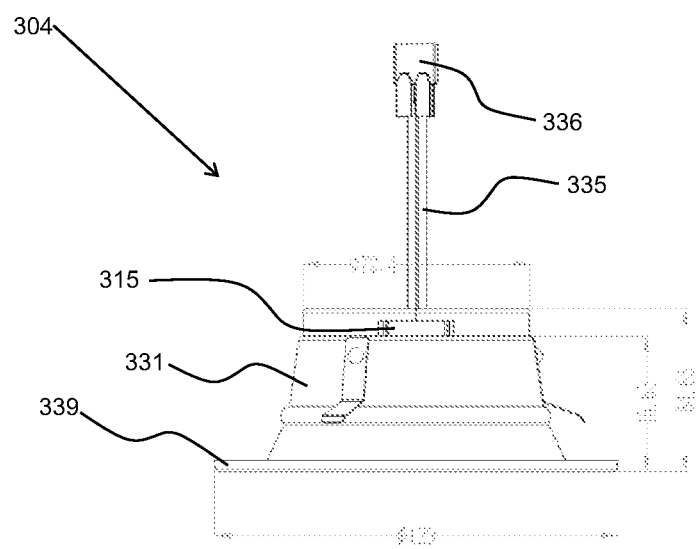
FIG. 24 illustrates a side view of the downlight of FIGS. 18-21 and 23, measurements in mm, in accordance with aspects of the embodiments.
Figure 25:
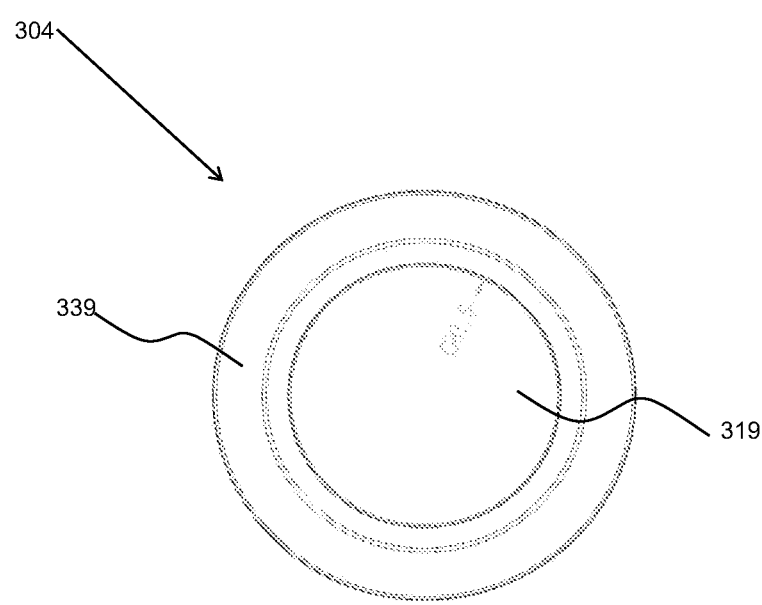
FIG. 25 illustrates a bottom view of the downlight of FIGS. 18-21 and 23-24, measurements in mm, in accordance with aspects of the embodiments.
Figure 26:
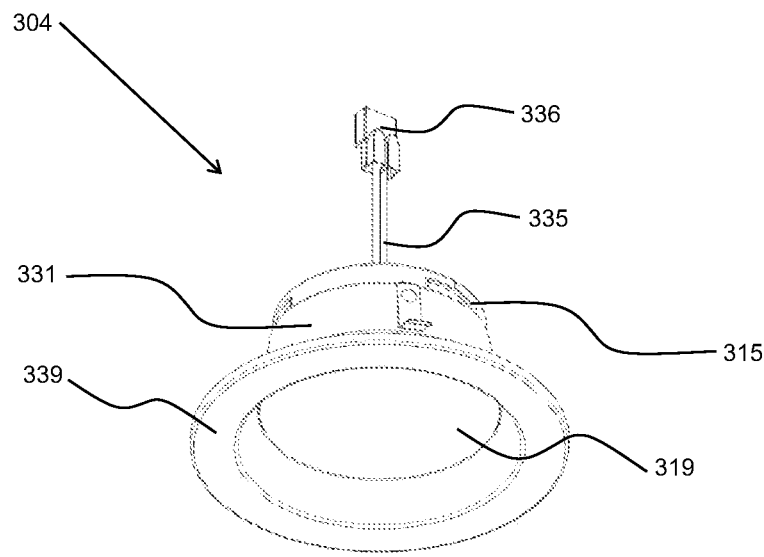
FIG. 26 illustrates the downlight of FIGS. 18-21 and 23-25 viewed from below in accordance with aspects of the embodiments.
Figure 27:
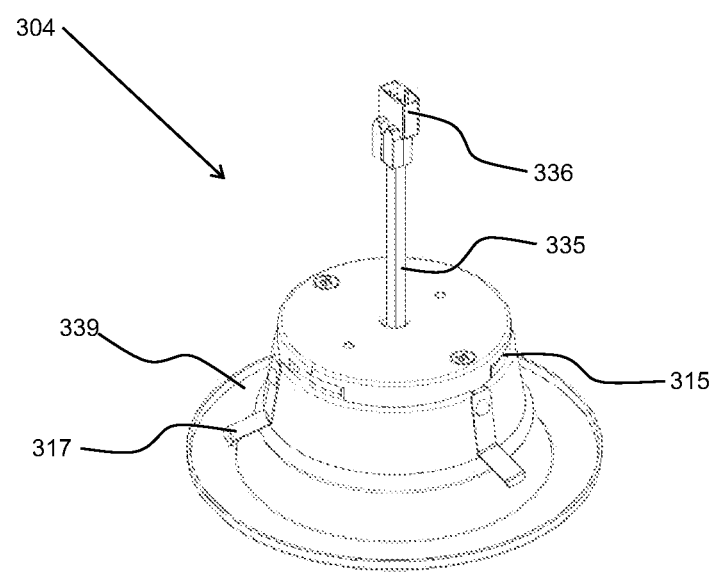
FIG. 27 illustrates the downlight of FIGS. 18-21 and 23-26 viewed from above in accordance with aspects of the embodiments.

The measurements of FIGS. 24 and 25 are in millimeters and indicate the downlight 304 is a four-inch downlight sized for installation in a four-inch fixture above a four-inch ceiling hole. The downlight housing 331 has a downlight flange 339 at its lower end. The flange has a width large enough cover a five-inch ceiling hole. As such, a ceiling hole accommodating this four-inch downlight can range from four to five inches. In normal operation, the four-inch downlight has a power requirement of 9 Watts or less of electric power while producing at least 600 lumens of light.

Figure 28:
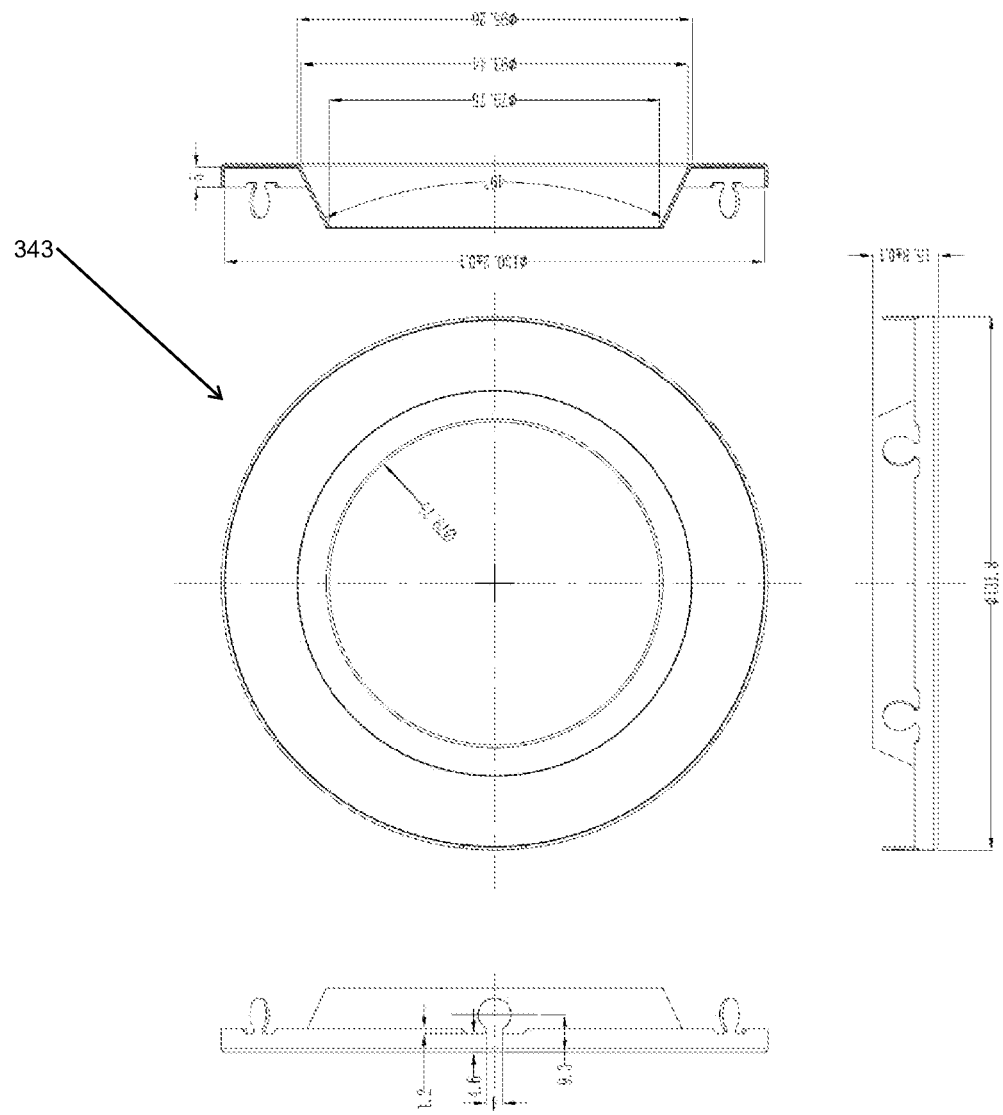
FIG. 28 presents views of trim for attachment to a downlight in accordance with aspects of the embodiments.
Figure 29:
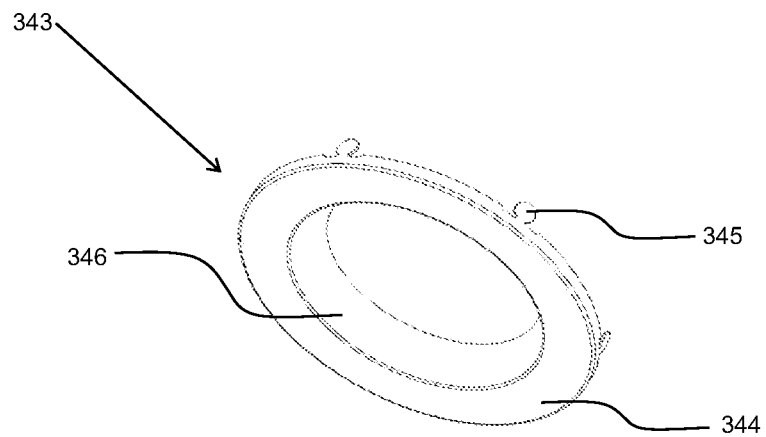
FIG. 29 illustrates the trim of FIG. 28 for attachment to a downlight viewed from below in accordance with aspects of the embodiments.
Figure 30:
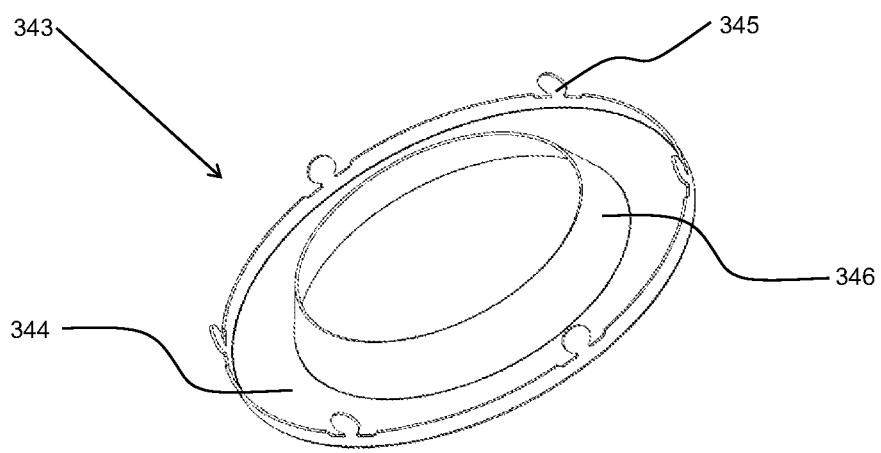
FIG. 30 illustrates the trim of FIGS. 28-29 viewed from above in accordance with aspects of the embodiments.

FIGS. 28-30 present views of trim 343 for attachment to a downlight 304 in accordance with aspects of the embodiments. The measurements of FIG. 28 are in millimeters. The trim 343 can be installed on a downlight 304 by positioning the trim flange 344 against the downlight flange 339 with the trim cone 346 extending into the downlight 304. The trim tabs 345 are then bent over the downlight flange 339 to therefore fix the trim 343 in place.

Figure 31:
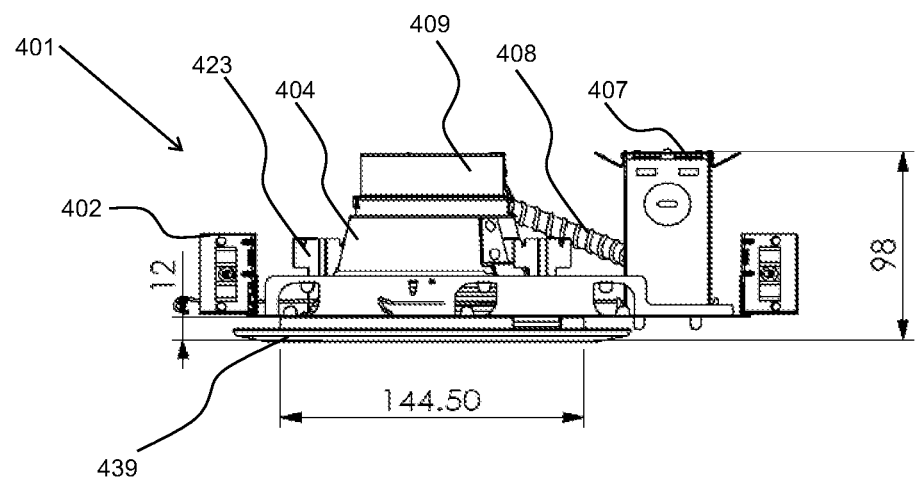
FIG. 31 illustrates a side view of a ceiling fixture with a downlight, measurements in mm, in accordance with aspects of the embodiments.
Figure 32:
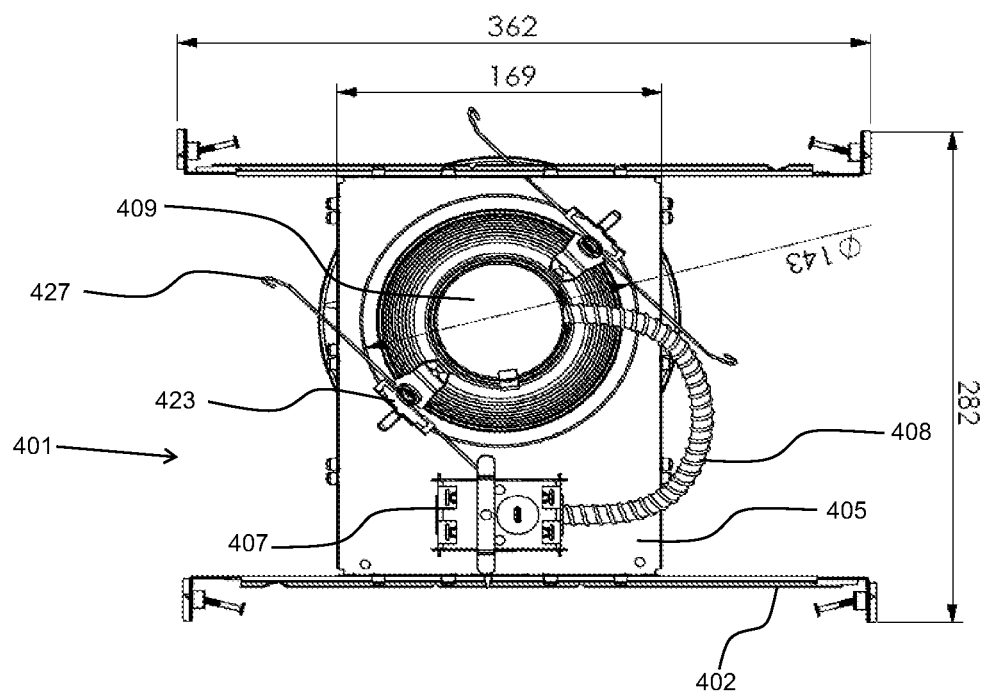
FIG. 32 illustrates a top view of the ceiling fixture and downlight of FIG. 31, measurements in mm, in accordance with aspects of the embodiments.
Figure 33:
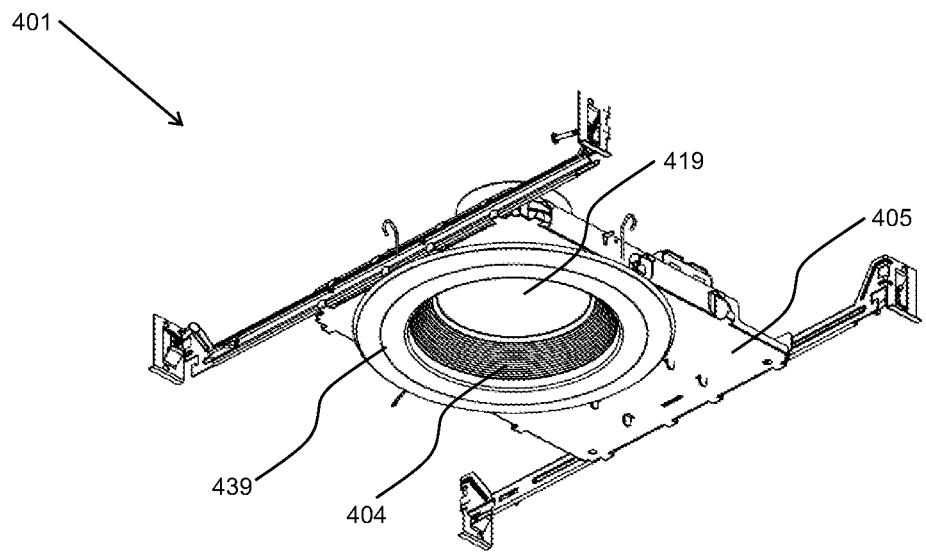
FIG. 33 illustrates the ceiling fixture and downlight of FIGS. 31-32 viewed from below in accordance with aspects of the embodiments.
Figure 34:
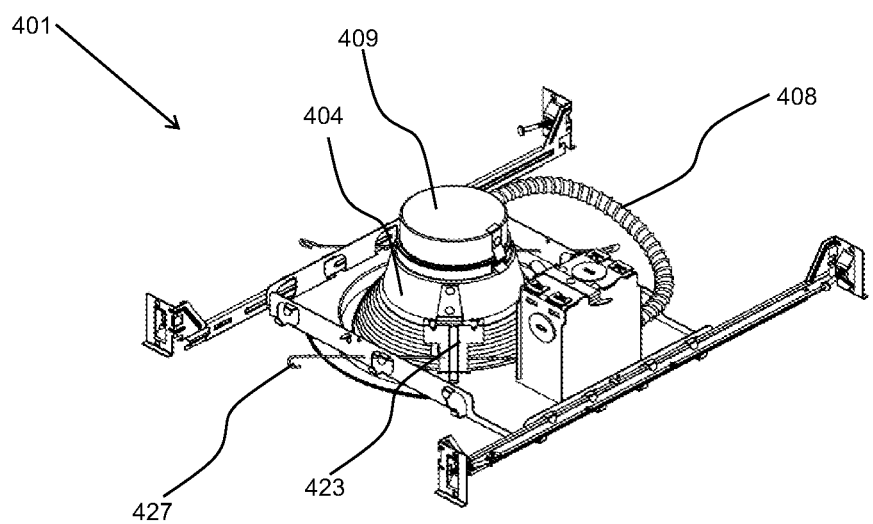
FIG. 34 illustrates the ceiling fixture and downlight of FIG. 31-33 viewed from above in accordance with aspects of the embodiments.
Figure 35:
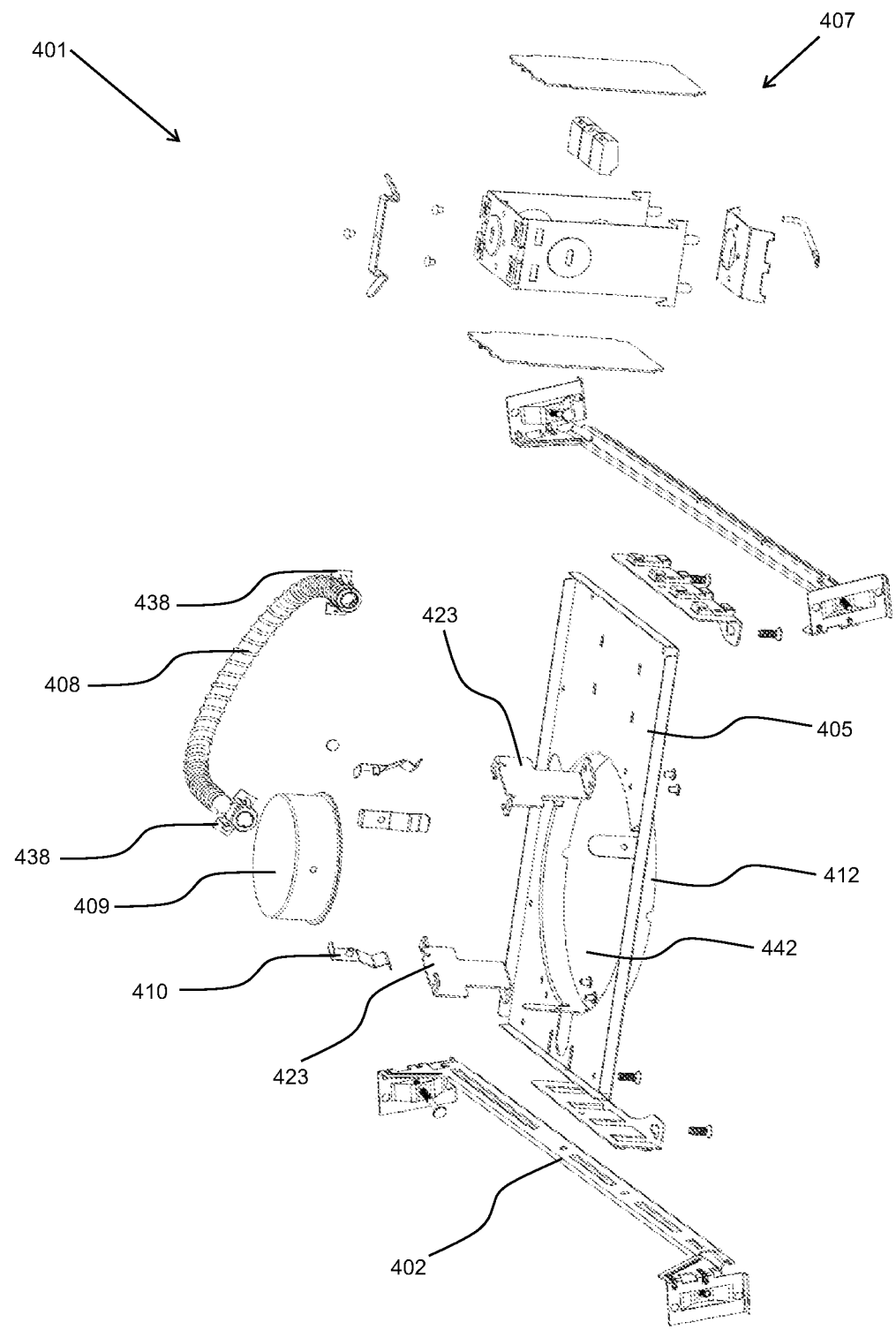
FIG. 35 illustrates an exploded view of the ceiling fixture of FIG. 31-34 in accordance with aspects of the embodiments.
Figure 36:
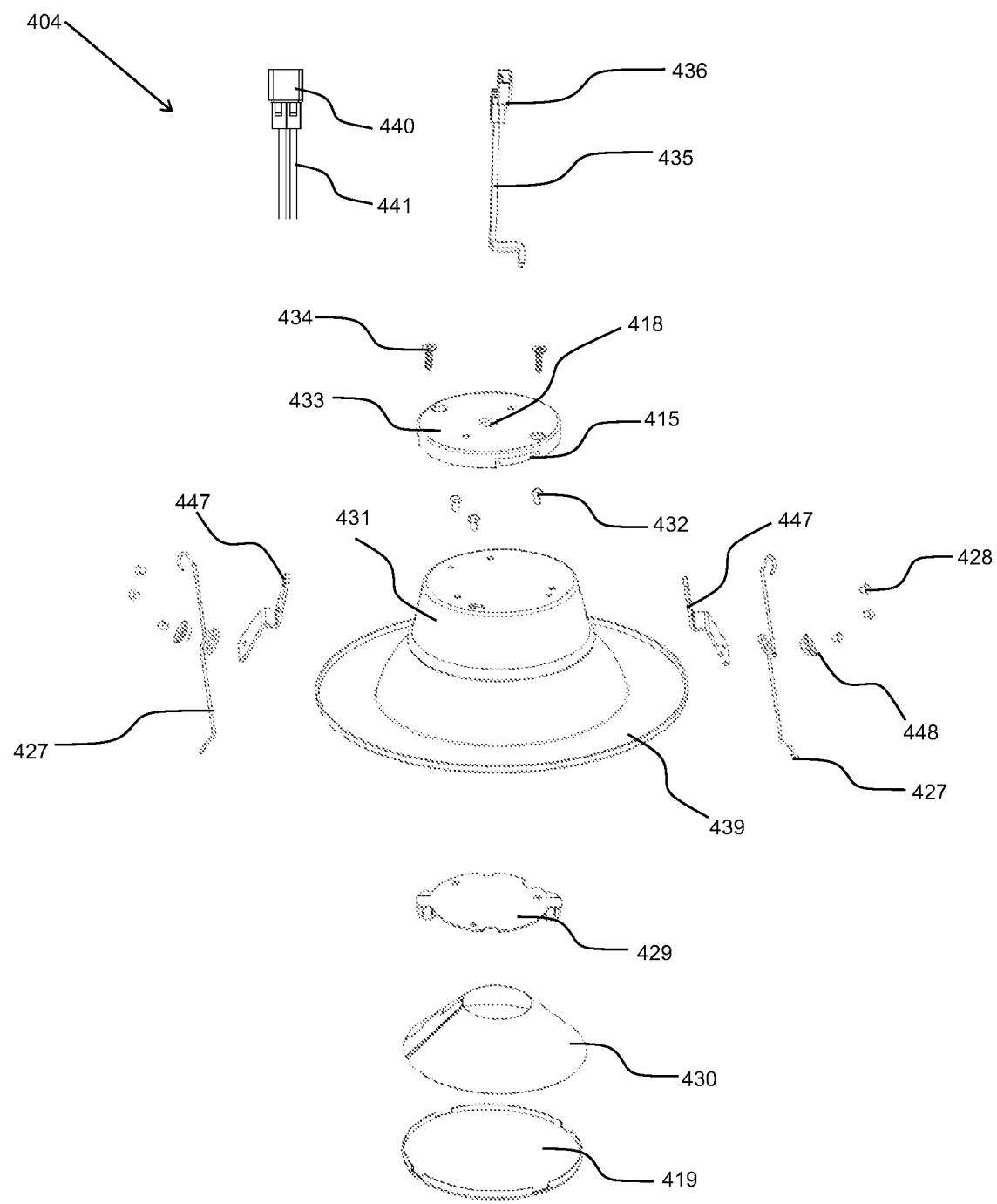
FIG. 36 illustrates an exploded view of the downlight of FIG. 31-34 in accordance with aspects of the embodiments.

FIGS. 31-35 illustrate a ceiling fixture 401 with a downlight 404 in accordance with aspects of the embodiments. The measurements of FIGS. 31-32 are in millimeters and are intended to be descriptive but are not intended to be limiting. The extendable hanger bars 402 are attached to opposite sides of the platform 405. The hanger bars 402 are configured for installing the ceiling fixture 401 between rafters in a ceiling such that the downlight 404, once installed, is flush against the ceiling. FIGS. 36-40 illustrate the downlight 404.

A junction box 407 is attached to the platform 405. Mains electric power can be provided to the junction box 407 to power the ceiling fixture 401 and downlight 404. An electric cable 408 extends from the junction box 407 to a cup 409 attached to the end of the downlight 404. Mains electric power can thereby be passed from the junction box 407 to the downlight 404. Connectors under the cup 409 can complete the route of electric power into the downlight 404. The cup 409 is held to the downlight 404 by cup clips 410 engaging clip indents 415 in the downlight 404. The cup clips 410 are attached to the cup 409 by rivets 437. Cable attachments 438 at either end of the electric cable 408 attach the electric cable 408 to the junction box 407 and cup 409. The electric cable 408 and cable attachments 438 are sized to prevent insulation and other materials from entering the cup 409 or junction box 407 via the holes through which the electric cable 408 enters the cup 409 and junction box 407.

A downlight guide 412 extends from the bottom of the platform 405 and supports 423 are attached to the platform 405. Here, the downlight 404 is attached to the supports 423 and held in a stationary position by suspension springs 427. As can be seen in the measurements, the downlight guide 412 and platform hole 442 are approximately 5.6 inches in diameter to thereby accommodate a six-inch downlight 404. As is well understood in the art, the term "six-inch" indicates a nominal size of the downlight and a fixture into which the downlight is designed to fit. "Four-inch" and "six-inch" are terms widely used in the art to indicate two different sizes of fixture and downlight.

FIGS. 36-40 illustrate various views of a downlight 404 with clip indents 415. The downlight 404 of FIGS. 36-40 is configured for use with the six-inch ceiling fixture 401 of FIGS. 31-35. The suspension springs 427 can be attached to brackets 447 by rivets 428 and torsion springs 448. The brackets 447 are attached to the downlight housing 431 by rivets 428. The suspension springs 427 can align the downlight 404 in the platform hole 442. Wiring 435 passing through the wire hole 418 can conduct electric power into the downlight 404. The electric power can pass through electric cable 408, a first electric connector 440, a second electric connector 436, and into wiring 435. Wires 441 are shown because electric cable 408 is a shielded electric cable having a shield protecting wires, such as wires 441, that conduct electric power from the junction box 407 to the downlight 404. The first electric connector 440 and the second electric connector 436 are inside the cup 409 when the cup 409 is held to the downlight 404 by the cup clips 410 engaging the clip indents 415.

Screws 434 attach back plate 433 to the downlight housing 431. Fasteners 432 attach the LED lighting unit 429 to the downlight housing 431 similar to the downlight housing and LED lighting unit of FIG. 9. Wiring 435 can be electrically connected to the LED lighting unit 429 that conditions the electric power from the junction box 407 to produce conditioned electric power. The LED lighting unit 429 has an LED array, such as that of FIG. 9, on its underside (not visible in FIG. 36) that produces light when it receives conditioned electric power. The light can then pass through lens 419 such that the downlight 404 produces illumination. A reflector 430 increase the amount of LED light exiting through the lens 419. The reflector 430 can be formed from a paper bent into a cone shape and having a reflective layer inside the cone.

Figure 37:
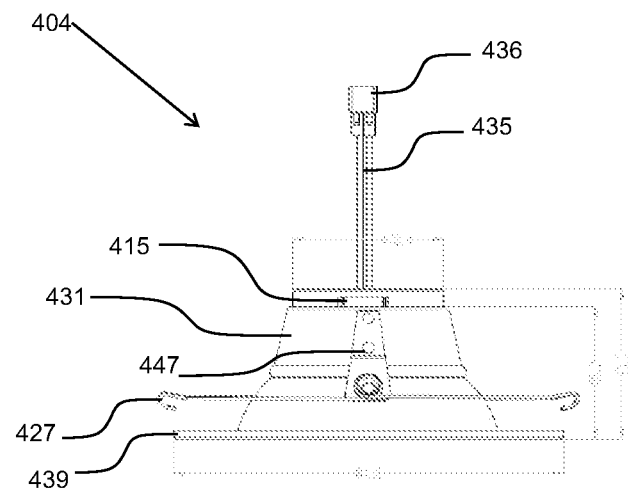
FIG. 37 illustrates a side view of the downlight of FIGS. 31-34 and 36, measurements in mm, in accordance with aspects of the embodiments.
Figure 38:
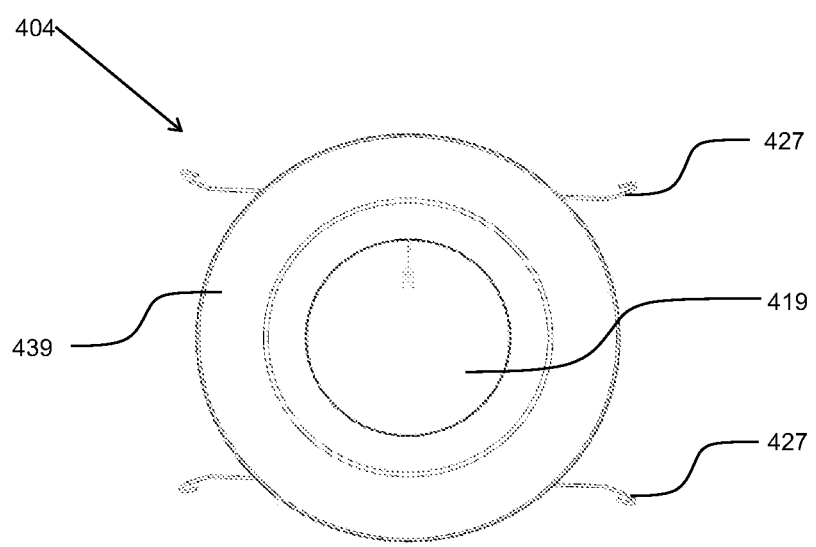
FIG. 38 illustrates a bottom view of the downlight of FIGS. 31-34 and 36-37, measurements in mm, in accordance with aspects of the embodiments.
Figure 39:
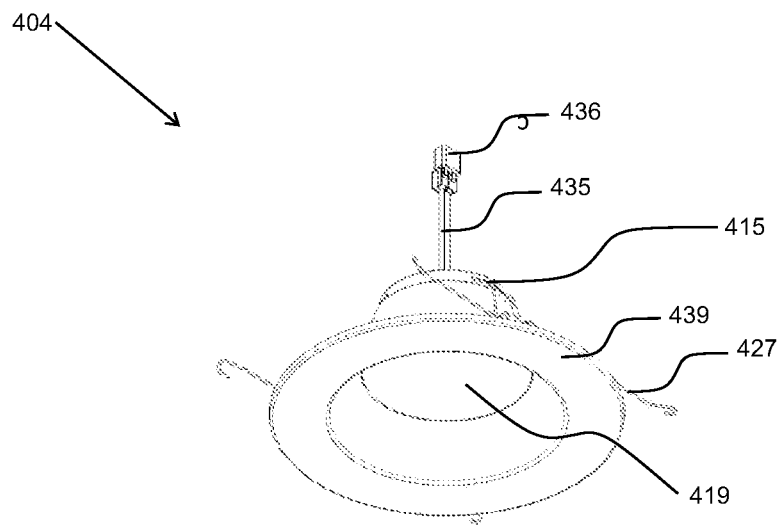
FIG. 39 illustrates the downlight of FIGS. 31-34 and 36-38 viewed from below in accordance with aspects of the embodiments.
Figure 40:
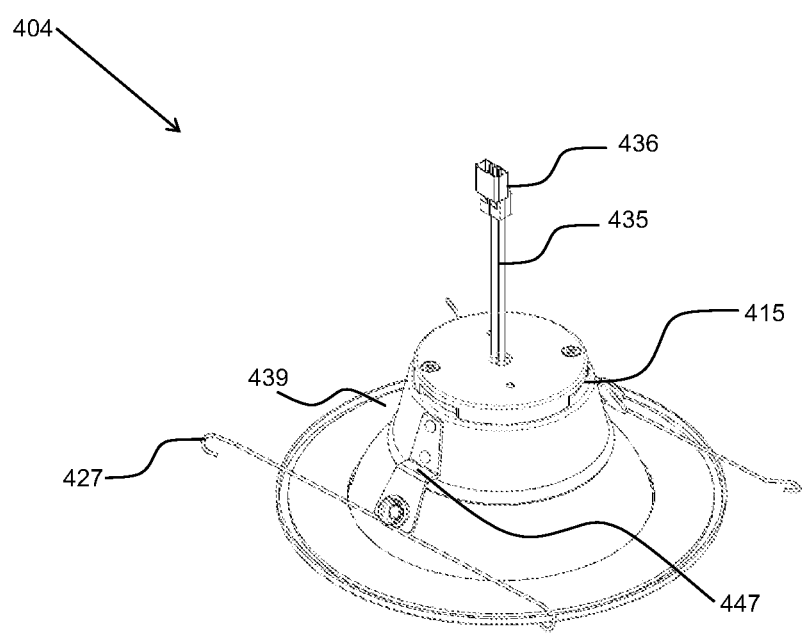
FIG. 40 illustrates the downlight of FIGS. 31-34 and 36-39 viewed from above in accordance with aspects of the embodiments.

The measurements of FIGS. 37 and 38 are in millimeters and indicate the downlight 404 is a six-inch downlight sized for installation in a six-inch fixture above a six-inch ceiling hole. The downlight housing 431 has a downlight flange 439 at its lower end. The flange has a width, 188 mm, large enough cover a 7.35 inch ceiling hole. As such, a ceiling hole accommodating this six-inch downlight can range from 6-7.35 inches. Two version of the six-inch downlight of FIGS. 36-40 have been tested. In normal operation, one version consumes 12 Watts or less of electric power while producing at least 800 lumens of light. The other version consumes 17 Watts or less of electric power while producing at least 1200 lumens of light in normal operation.

Figure 41:
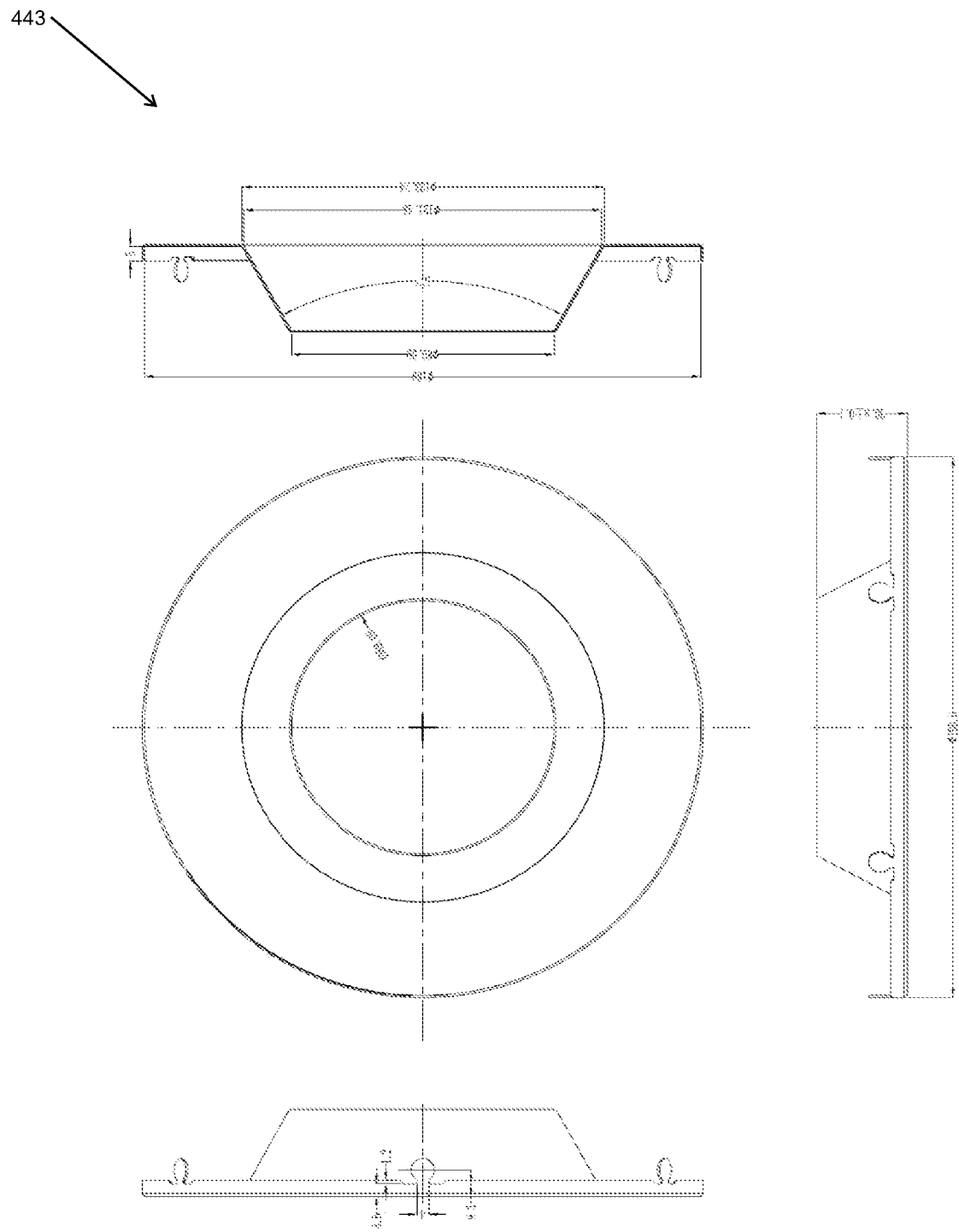
FIG. 41 presents views of trim for attachment to a downlight in accordance with aspects of the embodiments.
Figure 42:
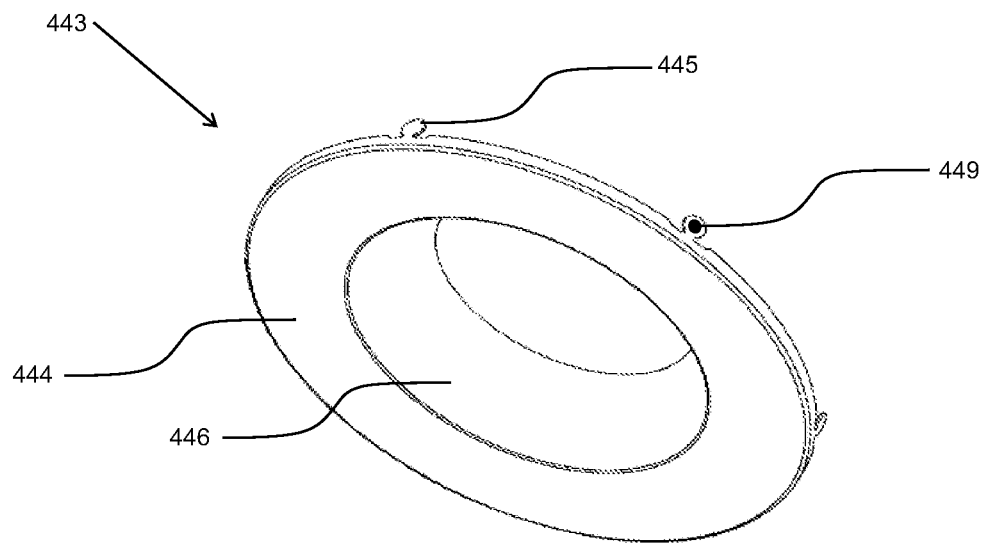
FIG. 42 illustrates the trim of FIG. 41 for attachment to a downlight viewed from below in accordance with aspects of the embodiments.
Figure 43:
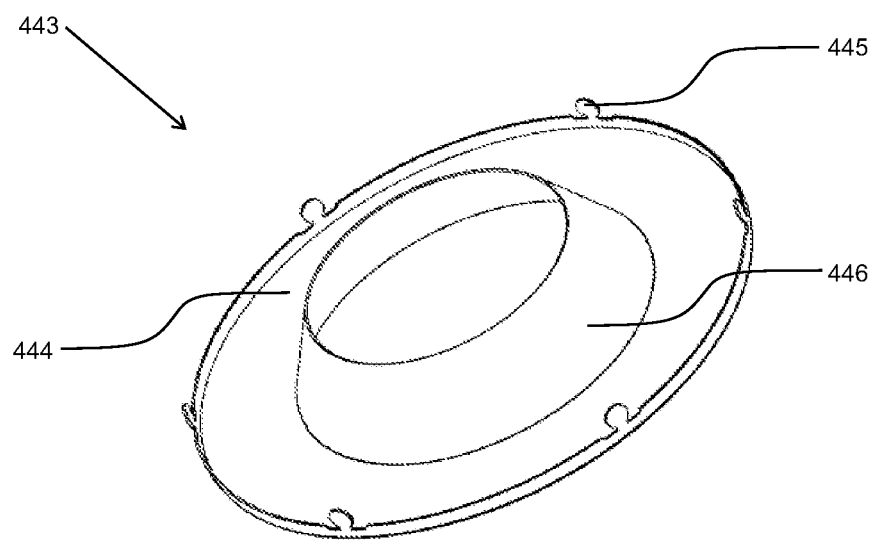
FIG. 43 illustrates the trim of FIGS. 41-42 viewed from above in accordance with aspects of the embodiments.

FIGS. 41-43 present views of trim 443 for attachment to a downlight 404 in accordance with aspects of the embodiments. The measurements of FIG. 41 are in millimeters. The trim 443 can be installed on a downlight 404 by positioning the trim flange 444 against the downlight flange 439 with the trim cone 446 extending into the downlight 404. The trim tabs 445 are then bent over the downlight flange 439 to therefore fix the trim 443 in place. A hole 449 in a trim tab can be used to suspend the trim 443 while a powder coating is applied and baked onto the trim 443.

Figure 44:
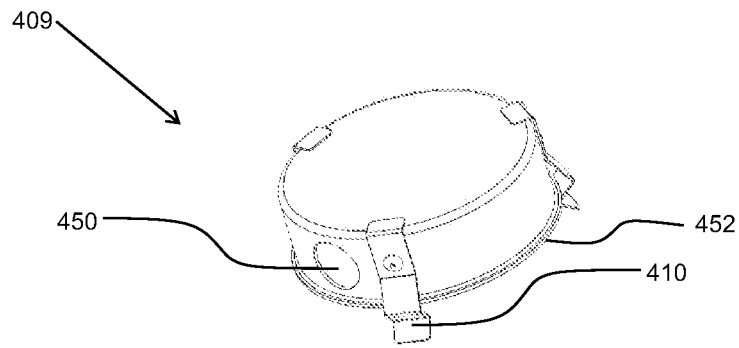
FIG. 44 illustrates a cup with cup clips viewed from above in accordance with aspects of the embodiments.
Figure 45:
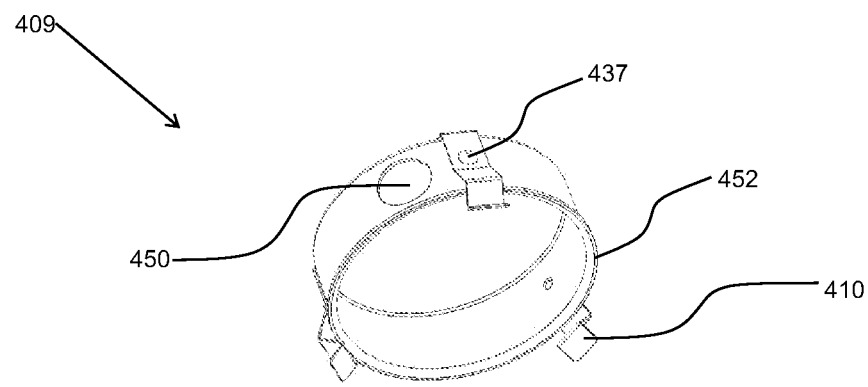
FIG. 45 illustrates the cup of FIG. 44 viewed from below in accordance with aspects of the embodiments.
Figure 46:
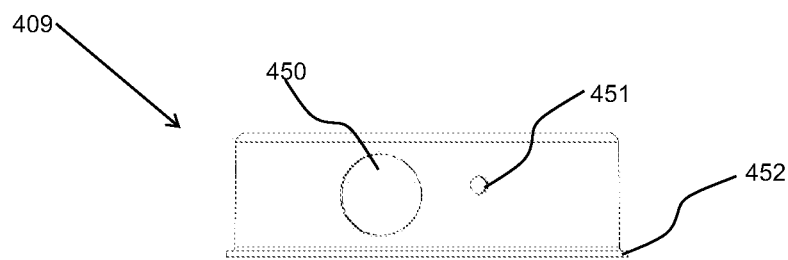
FIG. 46 illustrates a side view of the cup of FIGS. 44-45 in accordance with aspects of the embodiments.

FIGS. 44-46 show cup 409 in accordance with aspects of the embodiments. Cup clips 410 are attached to the cup by rivets 437. Electric cable 408 passes through cup hole 450 and is fixed in place by cable attachments 438. The electric cable 408 and cup hole 450 are sized to prevent insulation from entering the cup. The rivets 437 pass through rivet holes 451. The cup 409 has a cup rim 452 that is outwardly curved to thereby help prevent insulation from entering the cup 409 where the cup 409 meets the downlight 404.

Figure 47:
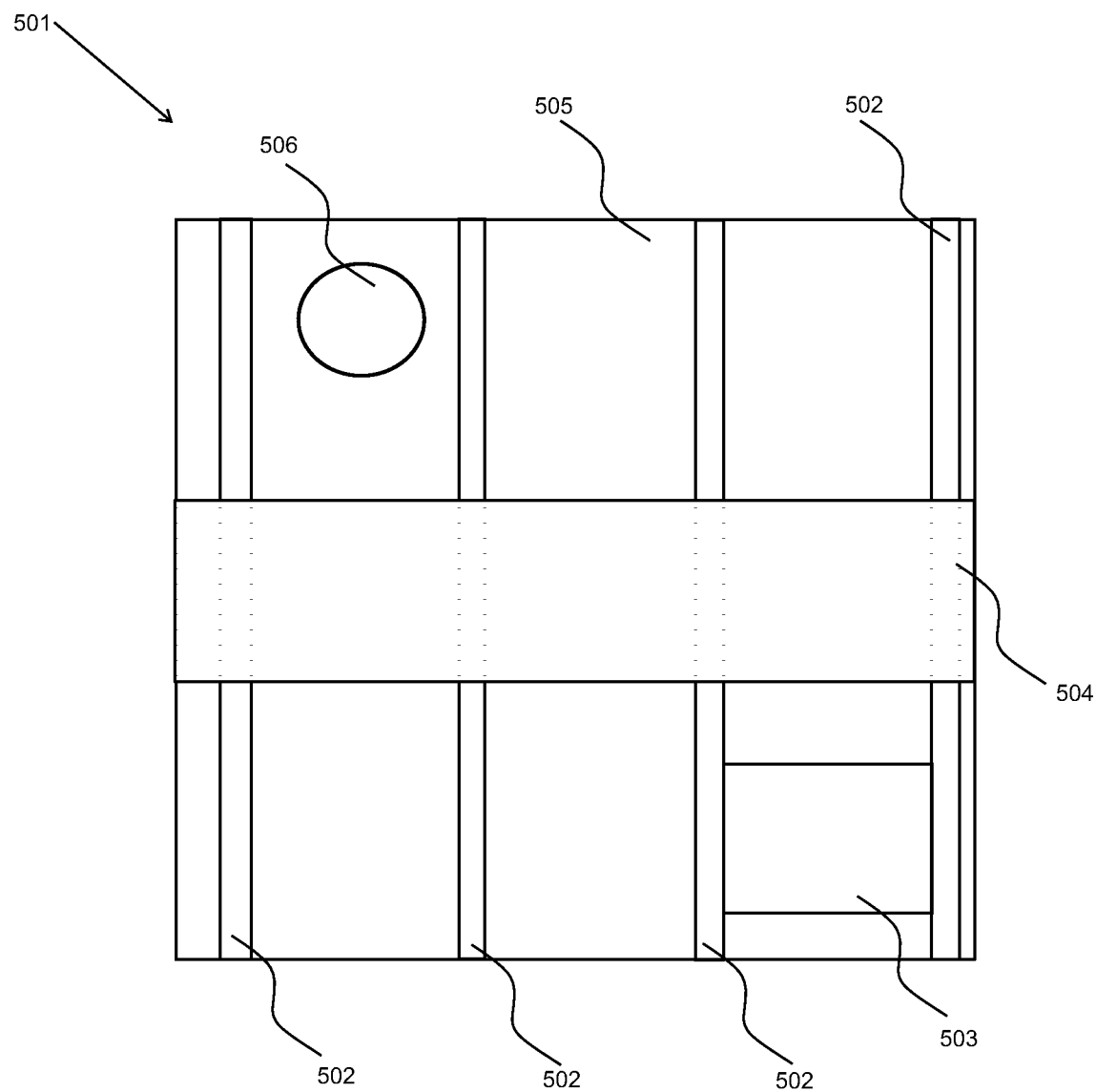
FIG. 47 illustrates a ceiling with rafters, a ceiling hole, a lighting system, and insulation in accordance with aspects of the embodiments.

FIG. 47 illustrates a ceiling 501 with rafters 502, a ceiling hole 506, a lighting system 503, and insulation 504 in accordance with aspects of the embodiments. The figure provides a top view of the ceiling 501. Sheeting 505, such as drywall or plywood, can be attached to the rafters 502 and insulation 504 can be spread over the ceiling. A ceiling hole 506 provides for a downlight in a ceiling fixture to illuminate a room or area below the ceiling. The lighting system 503 includes a ceiling fixture such as ceiling fixture 101, 201, 301, 401 and a downlight such as downlight 104, 204, 304, and 404. The lighting system 503 can be completely covered by insulation 504 without the insulation entering the junction box or cup of the lighting system. The lighting system, while in normal operation (the systems described above consume no more than 10, 11.5 and 16 Watts in normal operation), does not heat the insulation to the point of melting or ignition. In normal operation, the lighting system 503 does not expose the insulation 504 completely covering the lighting system 503 to a temperature above 90 degrees centigrade because sufficient heat from the lighting system radiates below the ceiling, because the lighting system produces little heat, and because the lighting system spread out the heat generated by the LED lighting unit 329, 429 and LED array 121. A ceiling fixture can be installed by attaching the hanger bars to and between two rafters 502.

Figure 48:
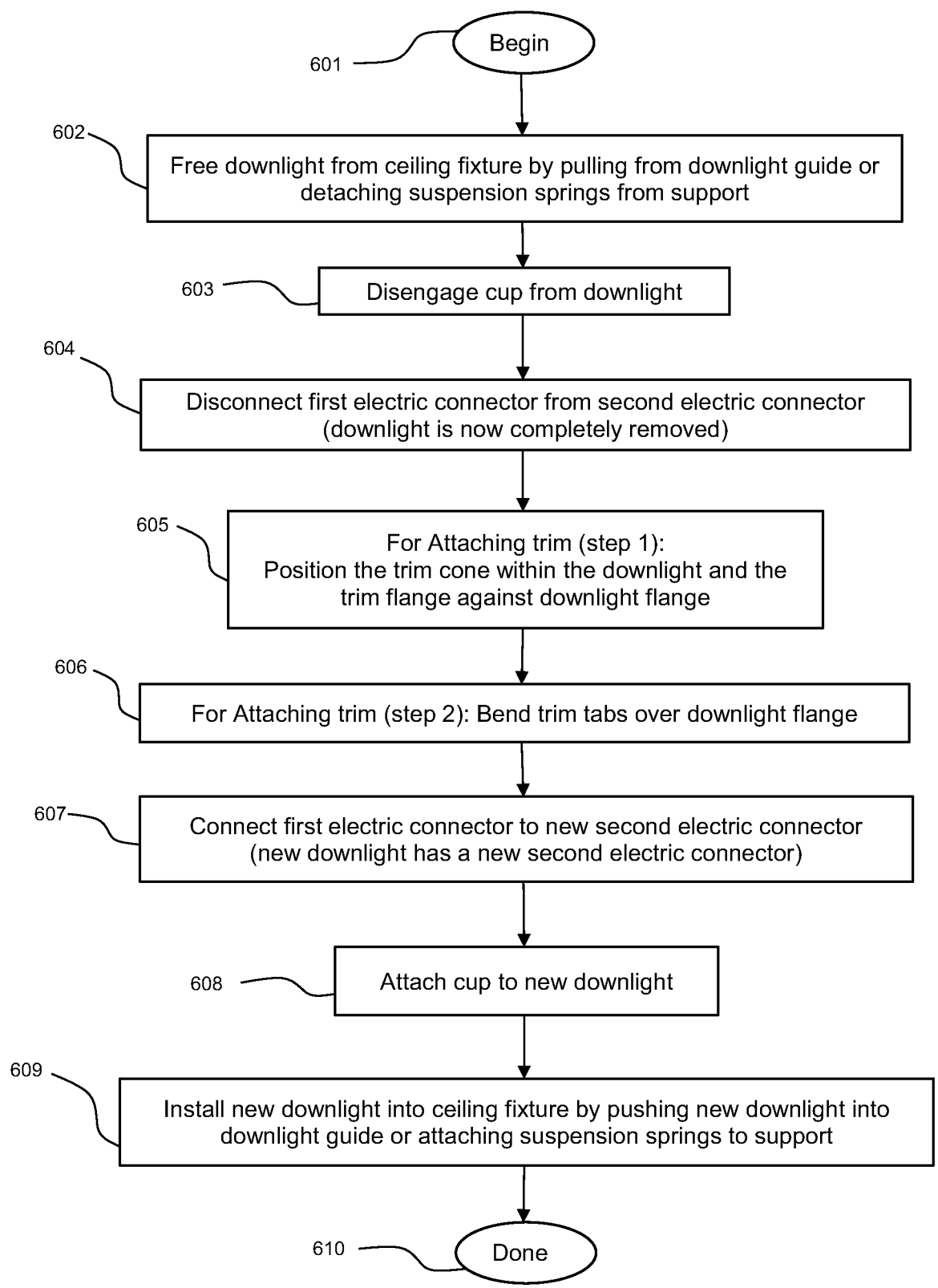
FIG. 48 illustrates a method for replacing a downlight in accordance with aspects of the embodiments.

FIG. 48 illustrates a method for replacing a downlight in accordance with aspects of the embodiments. The method begins 601 with the downlight being freed from the ceiling fixture by either pulling it free (downlights with positioners) or detaching the suspension springs from the supports 602. The cup can then be detached from the downlight 603 and the first electrical connector disconnected from the second electrical connector 604. The old downlight, now removed, can be discarded, refurbished, or recycled. If a trim is to be attached to the new downlight the trim can be positioned with its trim cone inside the downlight and the trim flange against the downlight flange 605. The trim can then be attached to the downlight by bending the trim tabs over the downlight flange 606. The new downlight has a new second connector that can be connected to the first connector 607 and then the cup attached to the downlight 608 with the connectors inside the cup. The new downlight can be installed into the ceiling fixture by pressing it into position (for downlights with positioners) or by attaching the suspension springs of the new downlight to the supports of the ceiling fixture 609. The new downlight installed, the method is done 610.

The trim can be recovered from the old downlight and attached to the new downlight. One purpose of the trim is to provide different colors to the downlight without providing differently colored downlights. In addition, an installer can paint the trim to match a ceiling, which is much easier than painting the downlight—particularly when a downlight is being replaced. An aspect of the downlight and trim combinations presented here is that the downlight in normal operation does not expose the trim to a temperature exceeding ninety degrees Celsius.

The illustrated ceiling fixtures have the junction box attached to the platform and with the downlight suspended from or held to elements that are not the junction box. Other downlights are configured for installation in or to a junction box. These ones are not.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A lighting system comprising:
    a ceiling fixture comprising a platform, two hanger bars, a junction box, an electric cable, a downlight guide, and a cup; and
    a downlight comprising a wire hole, a LED lighting unit, and a lens;
    wherein the two hanger bars, the junction box, and the downlight guide are attached to the platform;
    wherein the electric cable passes mains electric power from the junction box and into the cup;
    wherein the cup is configured to engage the downlight and to cover the wire hole;
    wherein the ceiling fixture and the downlight are configured without a can for holding the downlight; and
    wherein the lighting system is configured to be fully covered by ceiling insulation with the ceiling insulation laying directly on the cup, the downlight, and the junction box, the lighting system further configured to prevent the ceiling insulation from entering the cup, the downlight, and the junction box.

2. The lighting system of claim 1 wherein the lighting system is configured to prevent the ceiling insulation from being ignited by heat generated by the lighting system during normal operation.

3. The lighting system of claim 1 wherein the lighting system is configured to expose the ceiling insulation to a temperature no higher than 90 degrees centigrade during normal operation.

4. The lighting system of claim 1 further comprising a trim configured to be attached to the downlight by bending a plurality of trim tabs.

5. The lighting system of claim 1 wherein the lighting system is configured to provide illumination through a ceiling hole and to prevent the ceiling insulation from falling through the ceiling hole.

6. The lighting system of claim 1, the downlight further comprising a plurality of clip indents, the cup comprising a plurality of cup clips that engage the plurality of clip indents to thereby hold the cup and the downlight together.

7. The lighting system of claim 1, the downlight further comprising an engagement rim, wherein a plurality of screws threaded into the downlight guide are configured to be tightened to engage the engagement rim and thereby hold the downlight within the downlight guide.

8. The lighting system of claim 7 further comprising a plurality of access holes in the platform to provide access for turning the plurality of screws.

9. The lighting system of claim 1 further comprising a first electric connector and a second electric connector, wherein the first electric connector is attached to the electric cable, wherein the second electric connector is attached to a wiring passing through the wire hole and to the LED lighting unit, and wherein the first electric connector is configured to be removably connected to the second electric connector and pass the mains electric power to the LED lighting unit.

10. The lighting system of claim 1 wherein a plurality of positioners riveted to the downlight are configured to center the downlight in the downlight guide.

11. The lighting system of claim 1, the downlight further comprising at least two slots, the cup comprising at least two cup tongues that engage the at least two slots to thereby hold the cup and the downlight together.

12. The lighting system of claim 1, the ceiling fixture further comprising a plurality of supports, wherein a plurality of suspension springs attached to the downlight are configured to engage the plurality of supports to thereby suspend the downlight from the ceiling fixture.

13. The lighting system of claim 1 further comprising:
    a trim attached to the downlight by bending a plurality of trim tabs, the trim comprising a trim flange, a trim cone, and the plurality of trim tabs;
    a plurality of access holes in the platform and positioned to provide access to a plurality of screws threaded into the downlight guide and configured to be tightened to engage an engagement rim and thereby hold the downlight within the downlight guide, the downlight further comprising the engagement rim; and
    a first electric connector and a second electric connector, wherein the first electric connector is attached to the electric cable, wherein the second electric connector is attached to a wiring passing through the wire hole and to the LED lighting unit, and wherein the first electric connector is configured to be removably connected to the second electric connector and pass the mains electric power to the LED lighting unit;
    wherein the lighting system is configured to prevent the ceiling insulation from being ignited by heat generated by the lighting system during normal operation;
    wherein the lighting system is configured to expose the ceiling insulation to a temperature no higher than 90 degrees centigrade during normal operation;
    wherein the lighting system is configured to provide illumination through a ceiling hole and to prevent the ceiling insulation from falling through the ceiling hole;
    wherein the downlight further comprising a plurality of clip indents, the cup comprising a plurality of cup clips that engage the plurality of clip indents to thereby hold the cup and the downlight together;
    wherein a plurality of positioners riveted to the downlight are configured to center the downlight in the downlight guide; and
    wherein the lighting system provides for a method for replacing the downlight with a new downlight, the method for replacing the downlight with the new downlight comprising:
    positioning the trim cone within the new downlight;
    bending the plurality of trim tabs to engage the new downlight and thereby attach the trim to the new downlight;
    pulling the downlight from the downlight guide until the downlight is released from the ceiling fixture;
    disengaging the cup from the downlight;
    disconnecting the first electric connector from the second electric connector;
    connecting a new second electric connector to the first electric connector;

engaging the cup with the new downlight; and pushing the new downlight into the downlight guide until the downlight guide holds the downlight in a stationary position with the trim against a ceiling.

14. A lighting system comprising:

a ceiling fixture comprising a platform, two hanger bars, a junction box, an electric cable, a cup, and a platform hole, wherein the two hanger bars, and the junction box, are attached to the platform, and wherein the platform hole is in the platform;

a downlight comprising a wire hole, a LED lighting unit, and a lens;

a means for installing the ceiling fixture to a ceiling having a ceiling hole;

a means for removably attaching the cup to the downlight wherein the cup covers the wire hole; and a means for passing mains electric power from the junction box to the LED lighting unit;

a means for holding the downlight in a stationary position within the platform hole and the ceiling hole such that the LED lighting unit shines light through the lens and the ceiling hole;

wherein the ceiling fixture and the downlight are configured without a can for holding the downlight; and wherein the lighting system is configured to be fully covered by ceiling insulation with the ceiling insulation laying directly on the cup, the downlight, and the junction box, the lighting system further configured to prevent the ceiling insulation from entering the cup, the downlight, and the junction box.

15. The lighting system of claim 14 wherein the lighting system is configured to prevent the ceiling insulation from being ignited by heat generated by the lighting system during normal operation.

16. The lighting system of claim 14 wherein the lighting system is configured to expose the ceiling insulation to a temperature no higher than 90 degrees centigrade during normal operation.

17. The lighting system of claim 14 wherein the lighting system is configured to provide illumination through the ceiling hole and to prevent the ceiling insulation from falling through the ceiling hole.

18. The lighting system of claim 14 further comprising a trim and a means for attaching the trim to the downlight.

19. A method for replacing a downlight with a new downlight comprising:

pulling the downlight from a downlight guide until the downlight is released from being held stationary by a ceiling fixture comprising a platform, two hanger bars, a junction box, an electric cable, a cup, and the downlight guide, wherein the two hanger bars, the downlight guide, and the junction box, are attached to the platform;

disengaging the cup from the downlight;

disconnecting a first electric connector from a second electric connector, the first electric connector attached to the electric cable, the second electric connector attached to a wiring passing into the downlight and to a LED lighting unit within the downlight;

connecting a new second electric connector to the first electric connector;

attaching the cup with the new downlight; and pushing the new downlight into the downlight guide until the downlight guide holds the downlight in a stationary position wherein the lighting system is configured to be fully covered by ceiling insulation with the ceiling insulation laying directly on the cup, the downlight, and the junction box;

wherein the ceiling fixture and the downlight are configured without a can for holding the downlight.

20. The method for replacing a downlight with a new downlight of claim 19 further comprising:

positioning a trim cone of a trim within the new downlight, the trim comprising a trim flange, the trim cone, and a plurality of trim tabs; and bending the plurality of trim tabs to engage the new downlight and thereby attach the trim to the new downlight.

* * * * *